US012651866B2

(12) United States Patent

Obata et al.

(10) Patent No.: US 12,651,866 B2
(45) Date of Patent: Jun. 9, 2026

(54) CONNECTOR HAVING CONNECTOR POSITION ASSURANCE MEMBER, AND CONNECTOR ASSEMBLY INCLUDING THE CONNECTOR

(71) Applicant: JAPAN AVIATION ELECTRONICS INDUSTRY, LIMITED, Tokyo (JP)

(72) Inventors: Yusuke Obata, Tokyo (JP); Yukuya Morishita, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 291 days.

(21) Appl. No.: 18/386,638

(22) Filed: Nov. 3, 2023

(65) Prior Publication Data

US 2024/0162653 A1 May 16, 2024

(30) Foreign Application Priority Data

Nov. 16, 2022 (JP) ................................ 2022-183206

(51) Int. Cl.
*H01R 13/629* (2006.01)
*H01R 13/627* (2006.01)

(52) U.S. Cl.
CPC .................................. *H01R 13/629* (2013.01)

(58) Field of Classification Search
CPC ............ H01R 13/6271; H01R 13/1625; H01R 13/641
USPC ........................................ 439/153, 352, 752
See application file for complete search history.

(56) References Cited

U.S. PATENT DOCUMENTS 6,068,507 A 5/2000 Popa
7,048,568 B2 5/2006 Fisher et al.
9,876,313 B2 * 1/2018 Endo .................... H01R 13/639
11,664,625 B2 5/2023 Morishita et al.
2002/0052135 A1 5/2002 Noguchi et al.
(Continued)

FOREIGN PATENT DOCUMENTS

JP 3060296 B2 7/2000
JP 2005317401 A 11/2005
(Continued)

OTHER PUBLICATIONS

Extended European Search Report (EESR) dated Mar. 27, 2024, issued in counterpart European Application No. 23209707.1.

*Primary Examiner* — Hae Moon Hyeon
(74) *Attorney, Agent, or Firm* — Holtz, Holtz & Volek PC

(57) ABSTRACT

A connector comprises a housing and a connector position assurance (CPA) member. The housing is provided with a repositioning portion, a lock portion and a stopper. The CPA member has a base end portion, a regulating portion, a first arm portion, a distal end portion and a second arm portion. The distal end portion is provided with an abutment portion. The abutment portion is selectively positionable at a facing position or at a non-facing position. At least one of the first arm portion and the distal end portion is provided with a release projection. The release projection projects in a perpendicular direction from the at least one of the first arm portion and the distal end portion. Upon connection of the connector with a mating connector, the release projection is pushed by a mating release portion and moves the abutment portion from the facing position to the non-facing position.

5 Claims, 18 Drawing Sheets

(56) References Cited

U.S. PATENT DOCUMENTS

| | | | | |
|---|---|---|---|---|
| 2010/0233897 | A1* | 9/2010 | Seo | H01R 13/6272 439/345 |
| 2015/0270643 | A1 | 9/2015 | Myer et al. | |
| 2015/0295354 | A1* | 10/2015 | Morello | H01R 13/6272 439/352 |
| 2017/0250501 | A1* | 8/2017 | Endo | H01R 13/639 |
| 2022/0181823 | A1* | 6/2022 | Morishita | H01R 13/641 |
| 2023/0125720 | A1 | 4/2023 | Nakamura | |
| 2023/0127092 | A1* | 4/2023 | Echizenya | H01R 13/516 439/271 |
| 2023/0378694 | A1* | 11/2023 | Matsuo | H01R 13/639 |
| 2025/0279617 | A1* | 9/2025 | Saito | H01R 13/639 |

FOREIGN PATENT DOCUMENTS

| | | | |
|---|---|---|---|
| JP | 6213592 | B2 | 9/2017 |
| JP | 2021144787 | A | 9/2021 |
| JP | 2022032100 | A | 2/2022 |
| JP | 2022090961 | A | 6/2022 |

* cited by examiner

CONNECTOR HAVING CONNECTOR POSITION ASSURANCE MEMBER, AND CONNECTOR ASSEMBLY INCLUDING THE CONNECTOR

CROSS REFERENCE TO RELATED APPLICATIONS

This application is based on and claims priority under 35 U.S.C. § 119 to Japanese Patent Applications No. JP 2022-183206 filed Nov. 16, 2022, the contents of which are incorporated herein in their entirety by reference.

BACKGROUND OF THE INVENTION

This invention relates to a connector comprising a connector position assurance (CPA) member.

Referring to FIGS. 35 and 36, JP-A 2022-90961 (Patent Document 1) discloses a connector assembly 980 which comprises a connector 900 of this type and a mating connector 950. The connector 900 has a connector position assurance (CPA) function. The connector 900 is connectable with a mating connector 950 which is positioned beyond the connector 900 in a positive X-direction of an X-direction, or forward of the connector 900 in a front-rear direction. The mating connector 950 comprises a mating housing 960. The mating housing 960 has first lock portions 962, or mating lock portions 962, and stoppers 964. The connector 900 comprises a housing 930 and a mating detection member 940, or a CPA member 940. The housing 930 is mateable with the mating housing 960 which is positioned forward of the housing 930 in the front-rear direction. The housing 930 is provided with second lock portions 932, or lock portions 932. Each of the lock portions 932 is selectively positionable at a lock position or at a release position. When the lock portion 932 is positioned at the lock position, each of the lock portions 932 and a corresponding one of the mating lock portions 962 lock a mated state where the housing 930 is mated with the mating housing 960. The CPA member 940 is attached to the housing 930 so as to be movable between a regulation position and an allowance position in the front-rear direction. The CPA member 940 has a regulating portion (not shown), arm portions 941, abutment portions 942 and a shift operation portion 945. When the CPA member 940 is positioned at the regulation position, the regulating portion regulates a movement of each of the lock portions 932 from the lock position to the release position. When the CPA member 940 is positioned at the allowance position, the regulating portion allows the movement of each of the lock portions 932 from the lock position to the release position. The abutment portions 942 are supported by the arm portions 941, respectively. When the housing 930 is mated with the mating housing 960 under a state where the CPA member 940 is positioned at the regulation position, the abutment portions 942 abut against the stoppers 964, respectively, and the CPA member is moved from the regulation position to the allowance position. When, in this state, the CPA member 940 is moved forward while the shift operation portion 945 is pushed down, the CPA member 940 is moved from the allowance position to the regulation position. Accordingly, the CPA member 940 assures a mated state where the connector 900 and the mating connector 950 are mated with each other.

There is a need for a connector that has a CPA function such as the connector 900 of Patent Document 1 and is mateable also with an existing mating connector which is not designed particularly suitable for a CPA function.

SUMMARY OF THE INVENTION

It is therefore an object of the present invention to provide a connector which has a CPA function and which also is mateable with an existing mating connector that is not designed particularly suitable for the CPA function.

In general, a mating connector designed particularly suitable for a CPA function, such as the mating connector 950 of Patent Document 1, is provided with a stopping portion which regulates a movement of an abutment portion of a connector. In contrast, an existing mating connector that is not designed particularly suitable for a CPA function is not provided with such a stopping portion.

Considering the above, the inventors of the present application created the following configuration: a housing of a connector is provided with a stopper which is equivalent to the aforementioned stopping portion; an arm portion of a CPA member of the connector is provided with a release projection; a part of a mating housing of an existing mating connector that is not designed particularly for a CPA function is utilized as a mating release portion; and, in process of connection of the connector with the mating connector, the mating release portion of the mating connector abuts against the release projection of the connector to deform the arm portion and thereby an abutment portion of the CPA member is moved out of a position at which the abutment portion faces the stopper.

On the other hand, if the connector with the aforementioned configuration is connected with an existing mating connector that is not particularly designed for the CPA function and then the CPA member is moved from an allowance position to a regulation position, the release projection and the mating housing are brought into contact with each other and the arm portion supporting the release projection continues to be deformed because the mating housing of the mating connector does not have a clearance which prevents contact of the mating housing with the release projection of the connector. In the connector with the aforementioned configuration, the continuation of the deformation may cause a plastic deformation of the arm portion supporting the release projection and thereby may cause a permanent distortion of the arm portion. As a result, even when the CPA member is returned from the regulation position to the allowance position, the connector with the aforementioned configuration may take a state where the arm portion is not restored to its original shape and the abutment portion supported by the arm portion, thereby, is still out of the position for facing the stopper.

Based on the above, in addition to the aforementioned configuration, the inventors of the present application created a new additional configuration to complete the present invention such that the additional configuration enables the abutment portion to face the stopper when the CPA member is returned from the regulation position to the allowance position even in a case where the arm portion supporting the release projection is plastically deformed. It is noted that the present invention thus configured is also applicable to a connector that is to mate with a mating connector which is particularly designed for a CPA function.

One aspect of the present invention provides a connector connectable with a mating connector which is positioned forward of the connector in a front-rear direction. The mating connector comprises a mating housing. The mating housing has a mating lock portion and a mating release portion. The connector comprises a housing and a connector position assurance (CPA) member. The housing is mateable with the mating housing which is positioned forward of the housing in the front-rear direction. The housing is provided with a repositioning portion, a lock portion and a stopper. The repositioning portion is bulged in a perpendicular direction perpendicular to the front-rear direction. The lock portion is selectively positionable at a lock position or at a release position. When the lock portion is positioned at the lock position, the lock portion and the mating lock portion lock a mated state where the housing is mated with the mating housing. The CPA member is attached to the housing so as to be movable between a regulation position and an allowance position in the front-rear direction. The allowance position is positioned rearward of the regulation position in the front-rear direction. The CPA member has a base end portion, a regulating portion, a first arm portion, a distal end portion and a second arm portion. The regulating portion extends forward in the front-rear direction from the base end portion. When the CPA member is positioned at the regulation position, the regulating portion regulates a movement of the lock portion from the lock position to the release position. When the CPA member is positioned at the allowance position, the regulating portion allows the movement of the lock portion from the lock position to the release position. The first arm portion extends forward in the front-rear direction from the base end portion. The distal end portion is supported by the first arm portion. The distal end portion is provided with an abutment portion. The abutment portion is selectively positionable at a facing position or at a non-facing position. The abutment portion is positioned at the facing position when the connector is not connected with the mating connector while the CPA member is positioned at the allowance position. When the abutment portion is positioned at the facing position, the abutment portion is positioned rearward of the stopper in the front-rear direction and faces the stopper in the front-rear direction while a movement of the CPA member from the allowance position to the regulation position is regulated. When the abutment portion is positioned at the non-facing position, the abutment portion does not face the stopper in the front-rear direction while the CPA member is movable from the allowance position to the regulation position. At least one of the first arm portion and the distal end portion is provided with a release projection. The release projection projects in the perpendicular direction from the at least one of the first arm portion and the distal end portion. Upon connection of the connector with the mating connector, the release projection is pushed by the mating release portion and moves the abutment portion from the facing position to the non-facing position. The second arm portion extends forward in the front-rear direction from the base end portion. At least when the CPA member is positioned at the allowance position, the second arm portion is positioned away from the first arm portion in the perpendicular direction and is positioned between the release projection and the repositioning portion in the perpendicular direction. The second arm portion is provided with a pressed portion and a transmission portion. When the connector is removed from the mating connector after the CPA member is moved from the regulation position to the allowance position even in a case where the first arm portion is plastically deformed, the repositioning portion presses the pressed portion by a pressing force and the transmission portion transmits the pressing force to at least one of the first arm portion and the distal end portion and thereby the abutment portion is repositioned to the facing position.

The connector of the present invention is configured as follows: the connector comprises the housing and the CPA member; the housing is provided with the stopper; when the abutment portion is positioned at the facing position, the abutment portion is positioned rearward of the stopper in the front-rear direction and faces the stopper in the front-rear direction while the movement of the CPA member from the allowance position to the regulation position is regulated; when the abutment portion is positioned at the non-facing position, the abutment portion does not face the stopper in the front-rear direction while the CPA member is movable from the allowance position to the regulation position; the at least one of the first arm portion and the distal end portion is provided with the release projection; and, upon the connection of the connector with the mating connector, the release projection is pushed by the mating release portion of the mating connector and moves the abutment portion from the facing position to the non-facing position. Thus, the connector of the present invention has a CPA function and also is mateable with an existing mating connector that is not designed for the CPA function.

As described above, a problem of the plastic deformation of the arm portion might arise when the connector with the CPA function is mated with the existing mating connector that is not designed for the CPA function. Additionally, a similar problem of plastic deformation of an arm portion might also arise in case of a connector assembly with a CPA function when the connector and the mating connector thereof are mated with each other. Ideally, such a connector assembly is configured so that a CPA member cannot be moved unless the connector assembly is in a state where a connector and a mating connector are completely mated with each other. However, if, for example, the CPA member is forcibly moved from an allowance position to a regulation position under a state where the connector and the mating connector are in the middle of their mating process, an undesirable external force may be continuously applied to an arm portion and thereby the arm portion may be plastically deformed. In contrast, the connector of the present invention is configured as follows: the housing is provided with the repositioning portion; the CPA member has the second arm portion; the second arm portion is provided with the pressed portion and the transmission portion; and, when the connector is removed from the mating connector after the CPA member is moved from the regulation position to the allowance position even in the case where the first arm portion is plastically deformed, the repositioning portion presses the pressed portion by the pressing force and the transmission portion transmits the pressing force to the at least one of the first arm portion and the distal end portion and thereby the abutment portion is repositioned to the facing position. By those means, the connector of the present invention is configured so that, even in a case where the connector of the present invention and a mating connector designed for a CPA function are in the middle of their mating process while the CPA member is forcibly moved from the allowance position to the regulation position and the first arm portion supporting the release projection, thereby, is plastically deformed, the abutment portion is enabled to face the stopper appropriately when the CPA member is returned to the allowance position from the regulation position.

An appreciation of the objectives of the present invention and a more complete understanding of its structure may be had by studying the following description of the preferred embodiment and by referring to the accompanying drawings.

Figure 1:
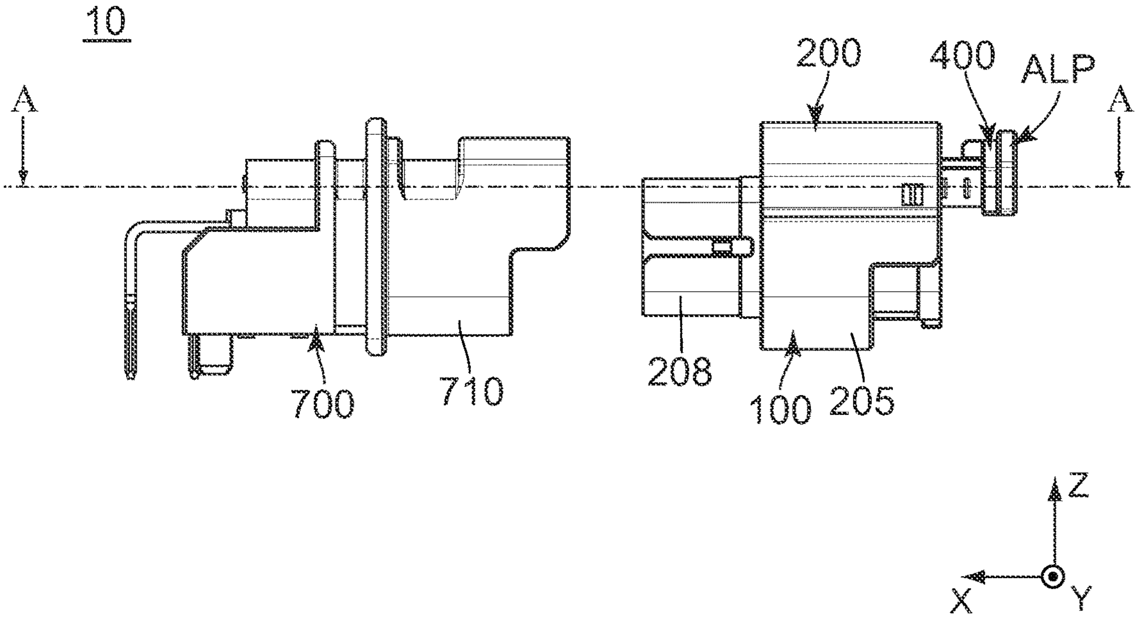
FIG. 1 is a side view showing a connector assembly according to an embodiment of the present invention. In the figure, the connector assembly is in an unmated state, and a CPA member of a connector is positioned at an allowance position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As shown in FIG. 1, a connector assembly 10 according to an embodiment of the present invention comprises a connector 100 and a mating connector 700.

Figure 30:
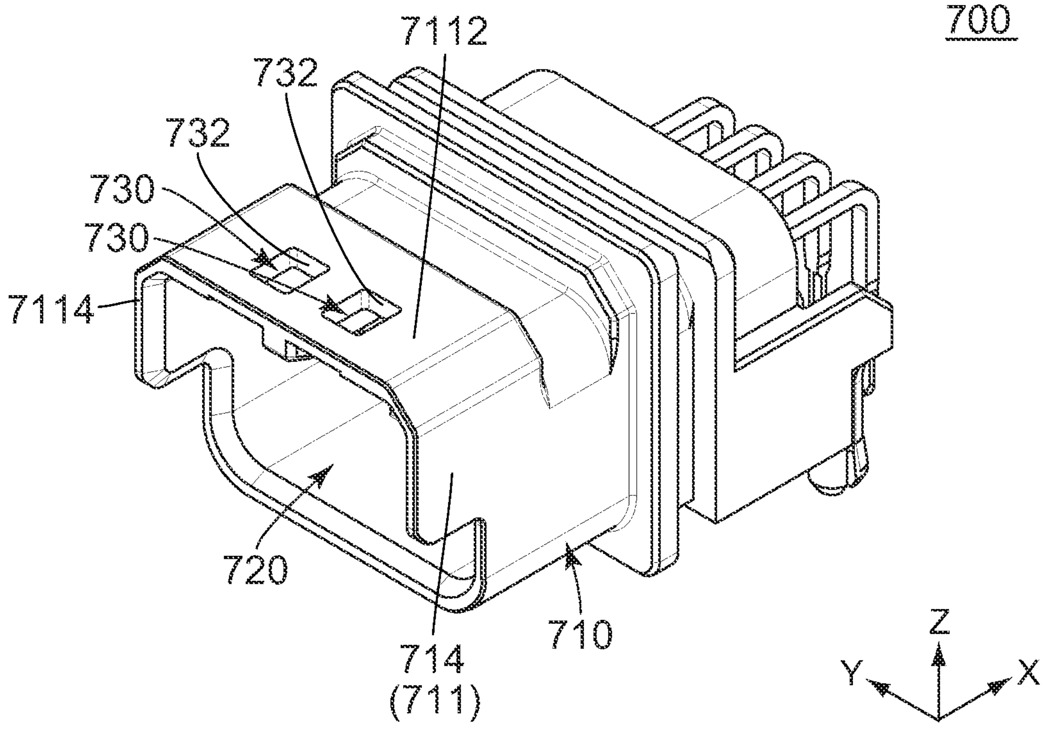
FIG. 30 is a front, perspective view showing a mating connector which is included in the connector assembly of FIG. 1.
Figure 31:
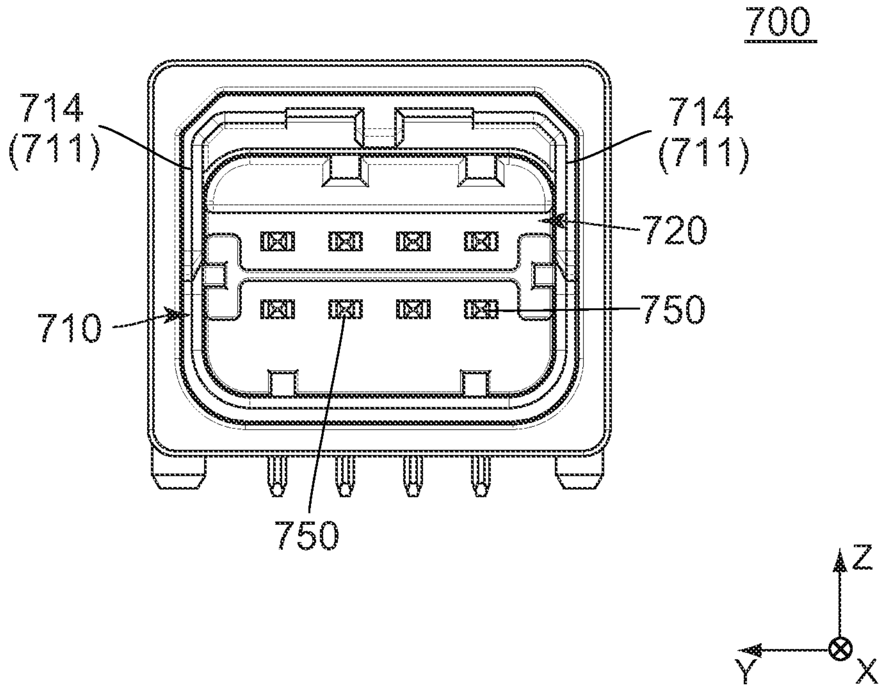
FIG. 31 is a front view showing the mating connector of FIG. 30.

Referring to FIG. 30, the mating connector 700 of the present embodiment is an existing plug which is not particularly designed for a CPA function. As shown in FIG. 31, the mating connector 700 comprises a mating housing 710 and a plurality of mating terminals 750.

Figure 34:
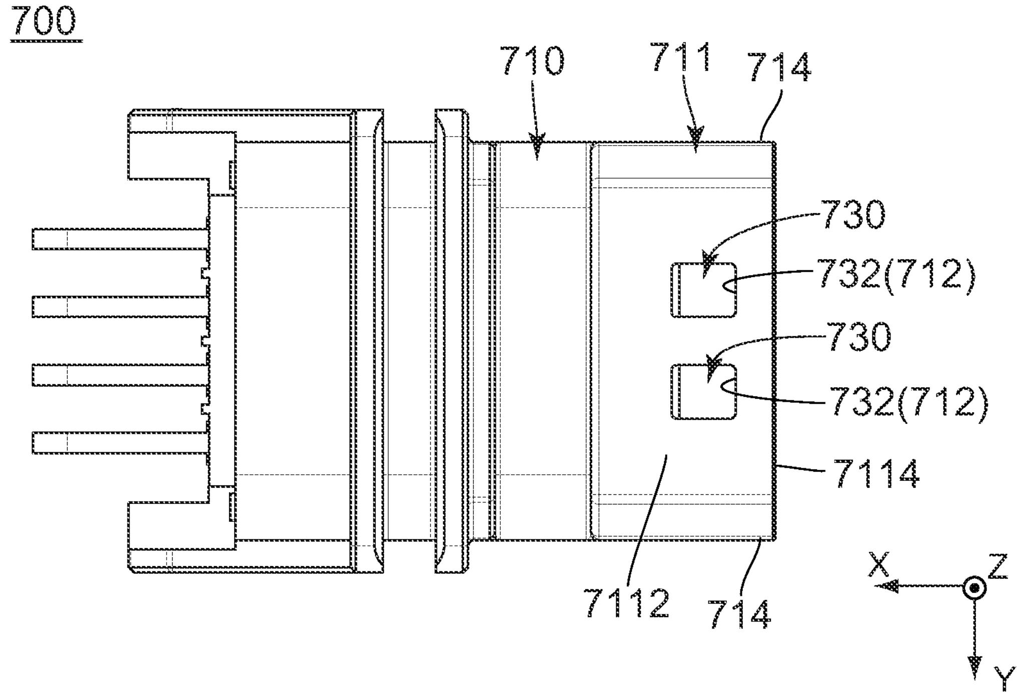
FIG. 34 is a top view showing the mating connector of FIG. 30.
Figure 35:
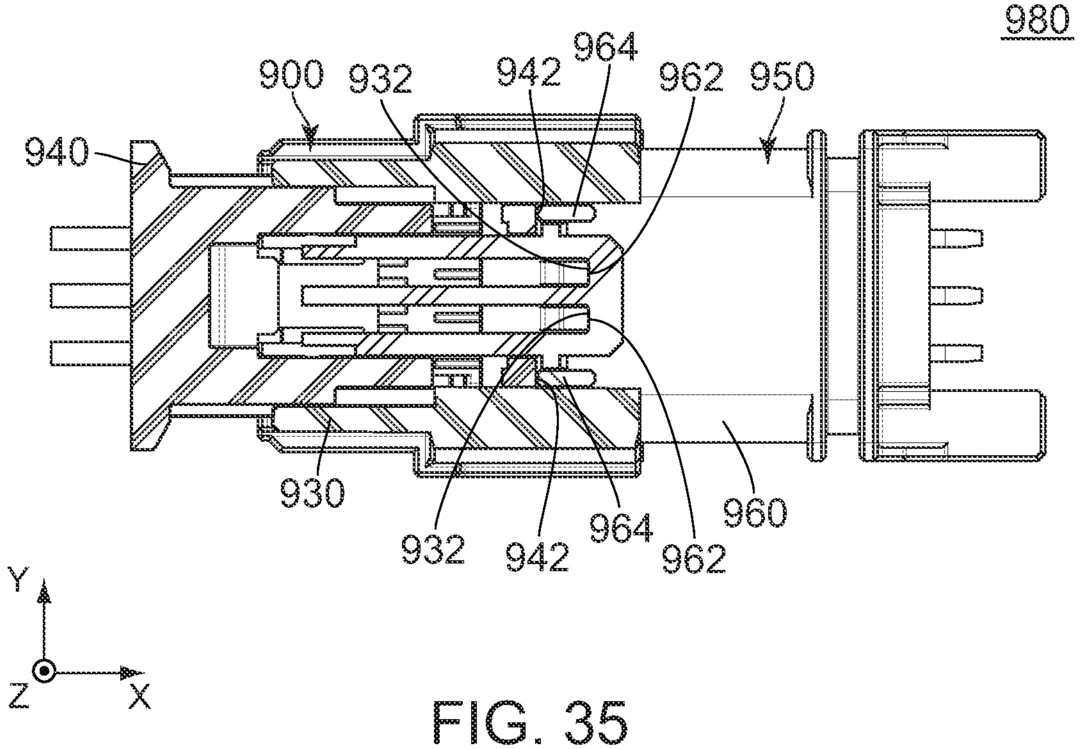
FIG. 35 PRIOR ART
FIG. 35 is a cross-sectional view showing a connector assembly of Patent Document 1.
Figure 36:
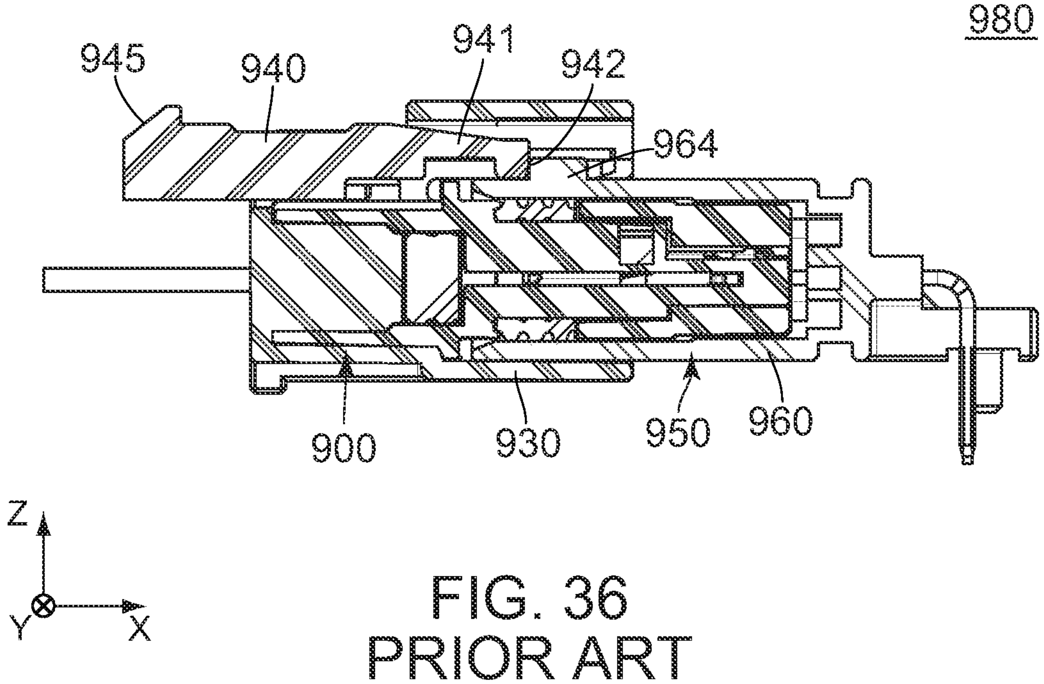
FIG. 36 PRIOR ART
FIG. 36 is another cross-sectional view showing the connector assembly of FIG. 35.

As shown in FIGS. 30, 31 and 34, the mating housing 710 of the present embodiment has two mating lock portions 712, two mating release portions 714 and a mating portion accommodating portion 720. Though the present invention is not limited thereto, the mating housing 710 should have at least one mating lock portion 712 and one mating release portion 714.

Figure 8:
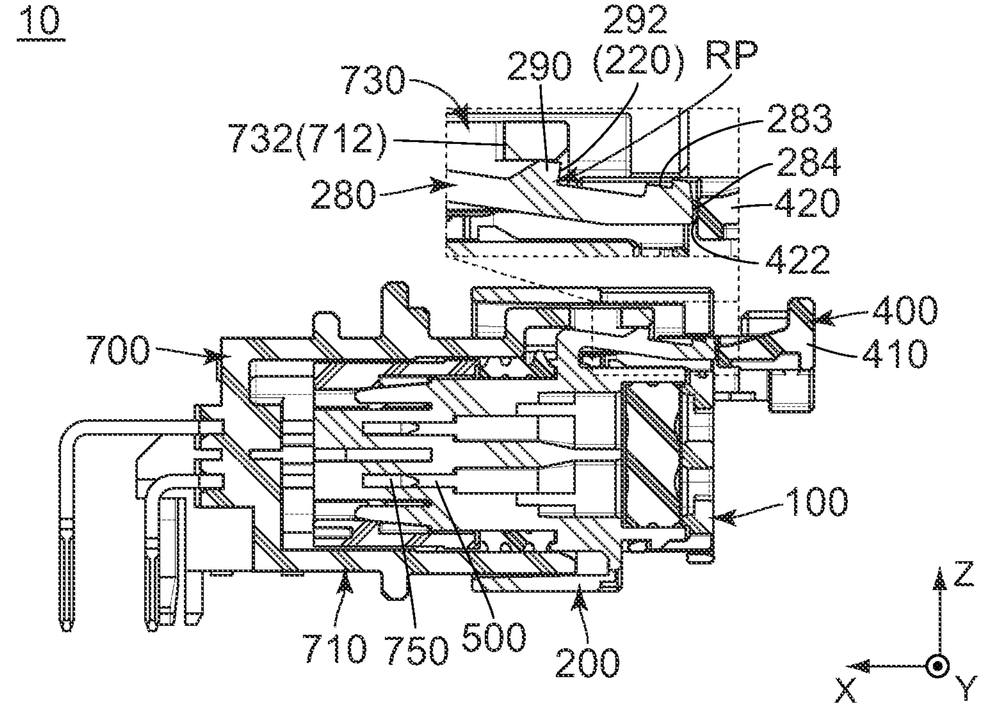
FIG. 8 is a cross-sectional view showing the connector assembly of FIG. 7, taken along line D-D. In the figure, a part of the connector assembly is enlarged and illustrated.
Figure 9:
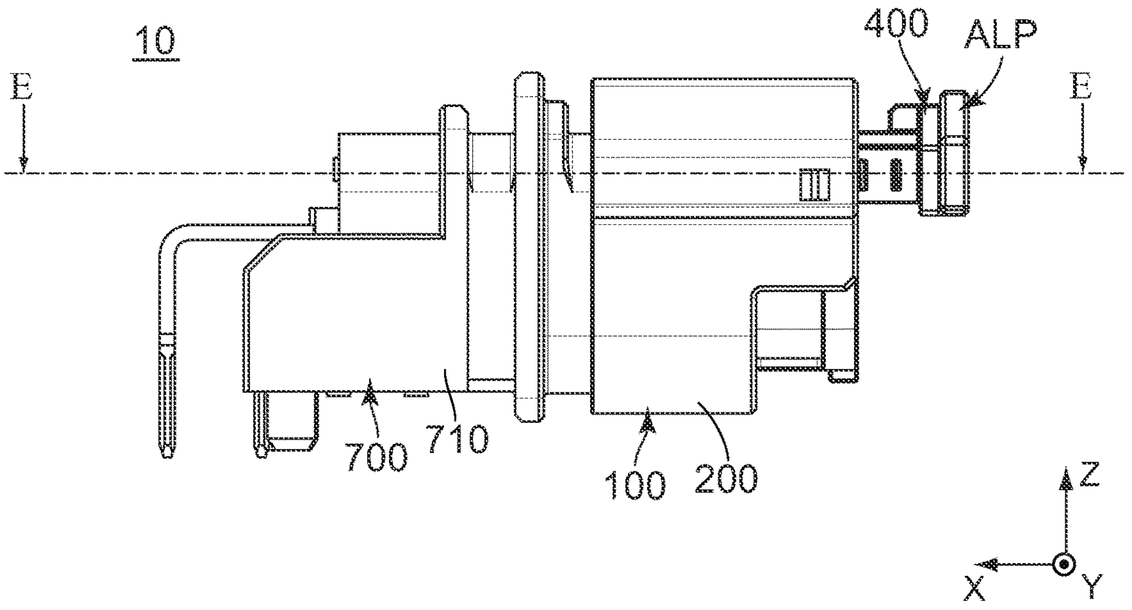
FIG. 9 is yet another side view showing the connector assembly of FIG. 1. In the figure, the connector assembly is in a mated state, and the CPA member is positioned at the allowance position.

As shown in FIG. 8, each of the mating lock portions 712 of the present embodiment faces forward in a front-rear direction. In the present embodiment, the front-rear direction is an X-direction. Specifically, forward is a positive X-direction while rearward is a negative X-direction. As shown in FIG. 34, each of the mating lock portions 712 is positioned around a rear end of the mating housing 710 in the front-rear direction.

Figure 32:
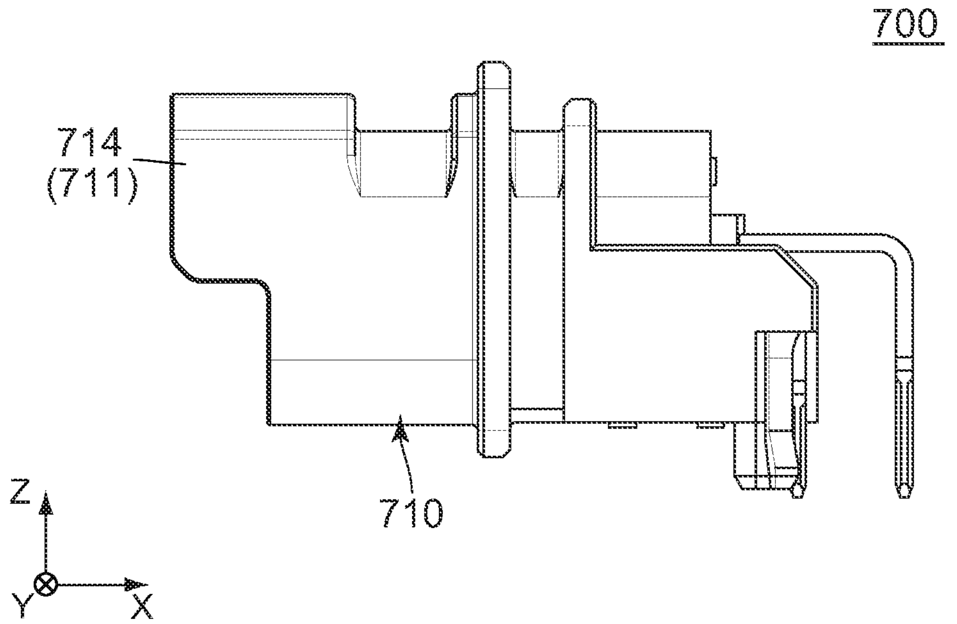
FIG. 32 is a side view showing the mating connector of FIG. 30.
Figure 33:
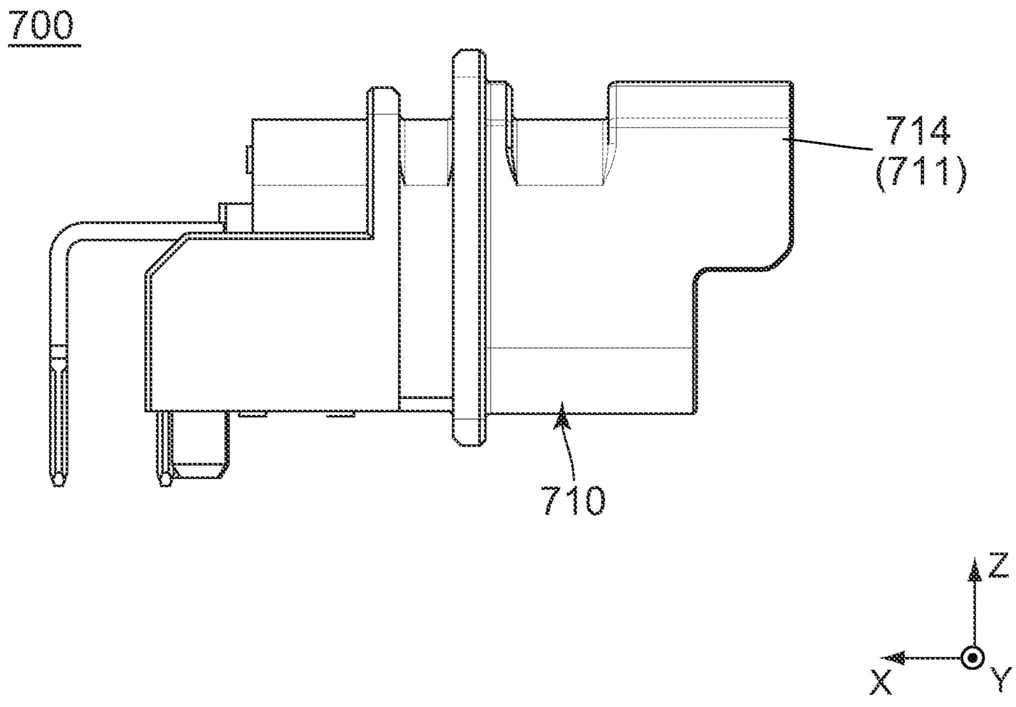
FIG. 33 is another side view showing the mating connector of FIG. 30.

As shown in FIGS. 32 and 33, the mating release portions 714 of the present embodiment are positioned at opposite sides, respectively, of the mating housing 710 in a width direction. Each of the mating release portions 714 faces outward in the width direction. Each of the mating release portions 714 is a plane perpendicular to the width direction. In the present embodiment, the width direction is a Y-direction. It is noted that, in the vicinity of any of the mating release portions 714, the mating housing 710 does not have a recess which is recessed inward in the width direction.

As shown in FIG. 30, the mating portion accommodating portion 720 of the present embodiment is a space extending in the front-rear direction. The mating portion accommodating portion 720 is opened at its rear end in the front-rear direction.

As shown in FIG. 30, the mating housing 710 of the present embodiment has a mating end portion 711.

As shown in FIGS. 32 and 33, the mating end portion 711 of the present embodiment defines the rear end of the mating housing 710 in the front-rear direction. Each of the mating release portions 714 is the plane facing outward in the width direction of the mating end portion 711 of the mating housing 710. As shown in FIG. 30, the mating end portion 711 has an upper surface 7112, a rear end 7114 and two holes 730. The upper surface 7112 faces upward in an up-down direction. In the present embodiment, the up-down direction is a Z-direction. Specifically, upward is a positive Z-direction while downward is a negative Z-direction. The rear end 7114 faces rearward in the front-rear direction. Each of the holes 730 pierces the upper surface 7112 in the up-down direction. Each of the holes 730 has a peripheral surface 732. A part of the peripheral surface 732 functions as the mating lock portion 712.

Referring to FIG. 31, each of the mating terminals 750 of the present embodiment is made of metal. The mating terminals 750 are held by the mating housing 710.

Figure 13:
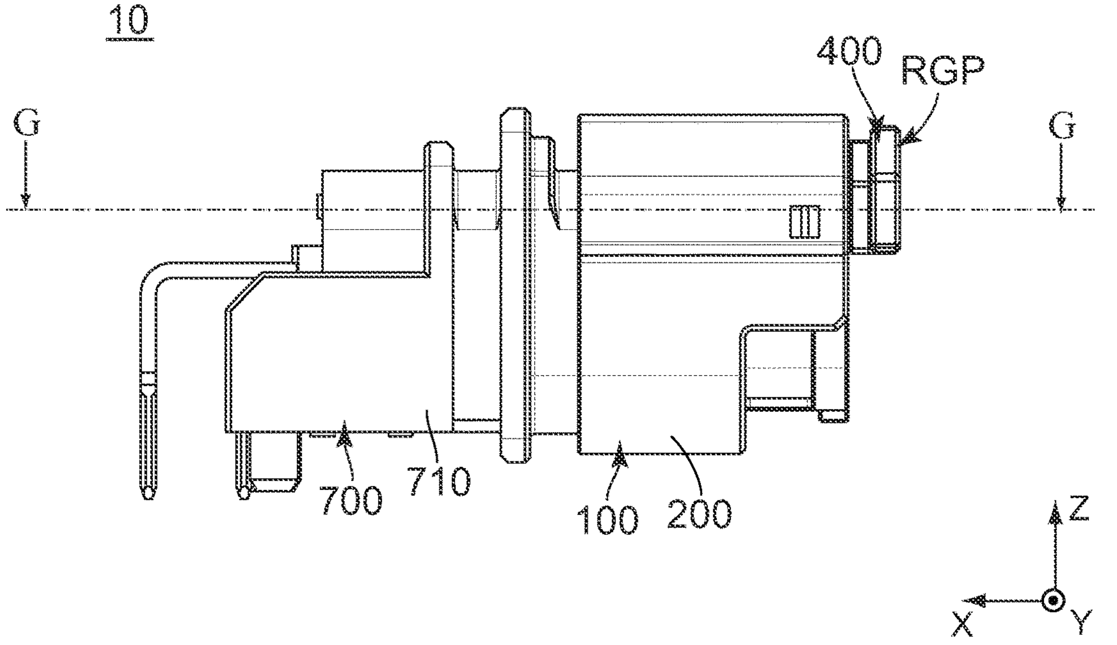
FIG. 13 is still another side view showing the connector assembly of FIG. 1. In the figure, the connector assembly is in a mating assurance state, and the CPA member is positioned at a regulation position.
Figure 17:
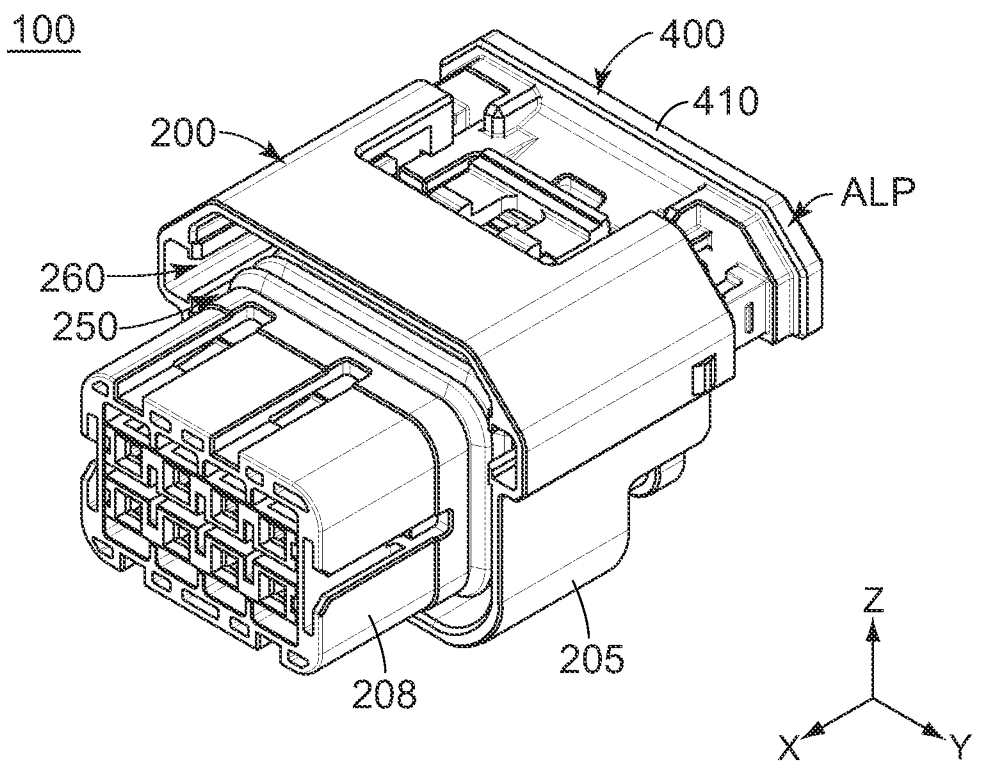
FIG. 17 is a front, perspective view showing the connector which is included in the connector assembly of FIG. 1.
Figure 18:
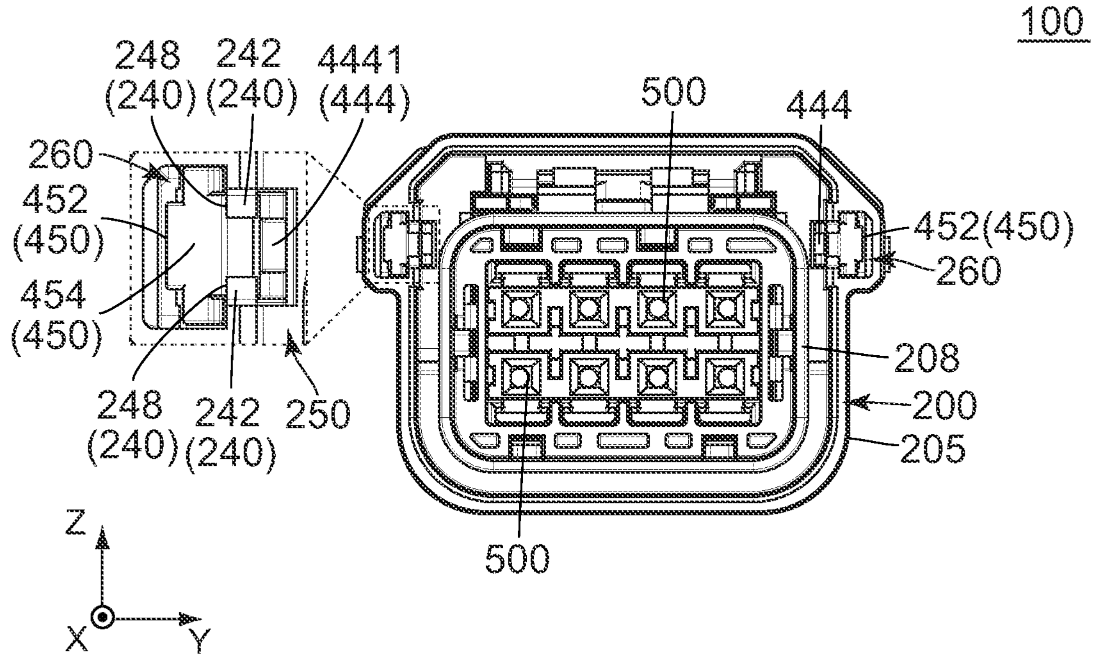
FIG. 18 is a front view showing the connector of FIG. 17. In the figure, a part of the connector is enlarged and illustrated.

As shown in FIG. 13, the connector 100 of the present embodiment is connectable with the mating connector 700 which is positioned forward of the connector 100 in the front-rear direction. As shown in FIGS. 17 and 18, the connector 100 comprises a housing 200, a connector position assurance (CPA) member 400 and a plurality of terminals 500.

Figure 14:
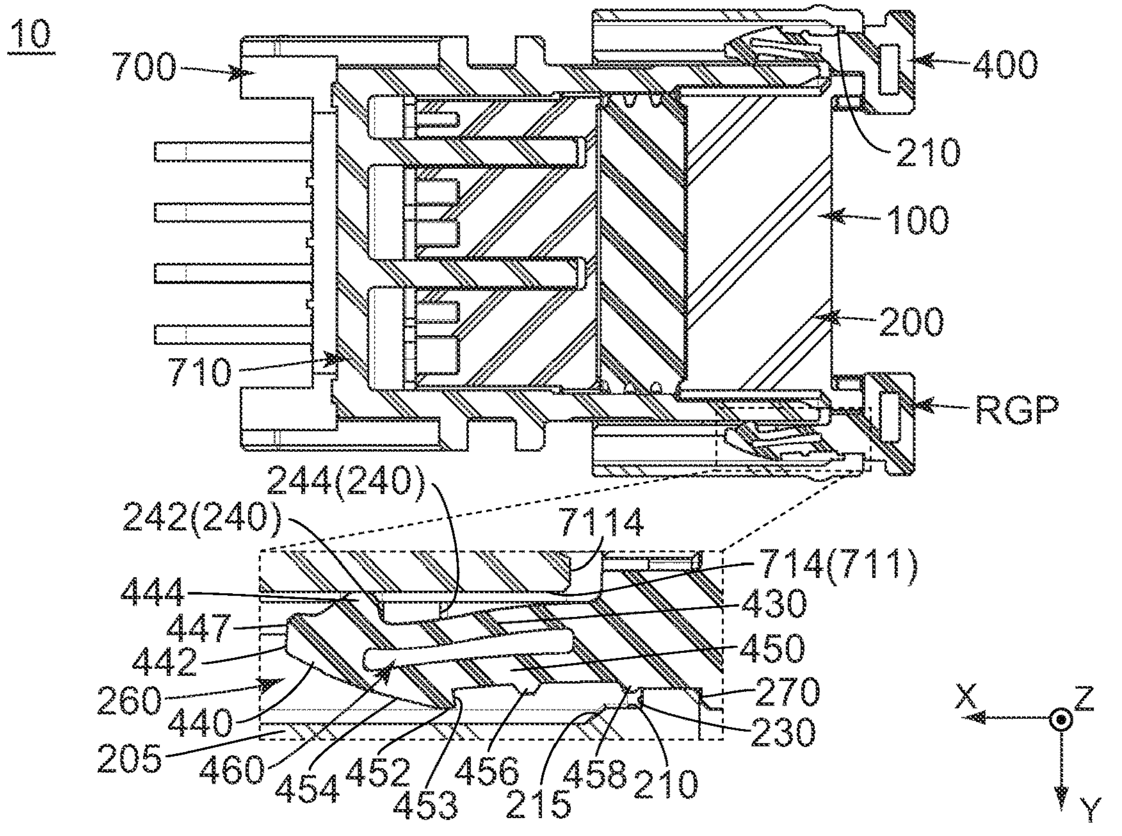
FIG. 14 is a cross-sectional view showing the connector assembly of FIG. 13, taken along line G-G. In the figure, a part of the connector assembly is enlarged and illustrated.
Figure 16:
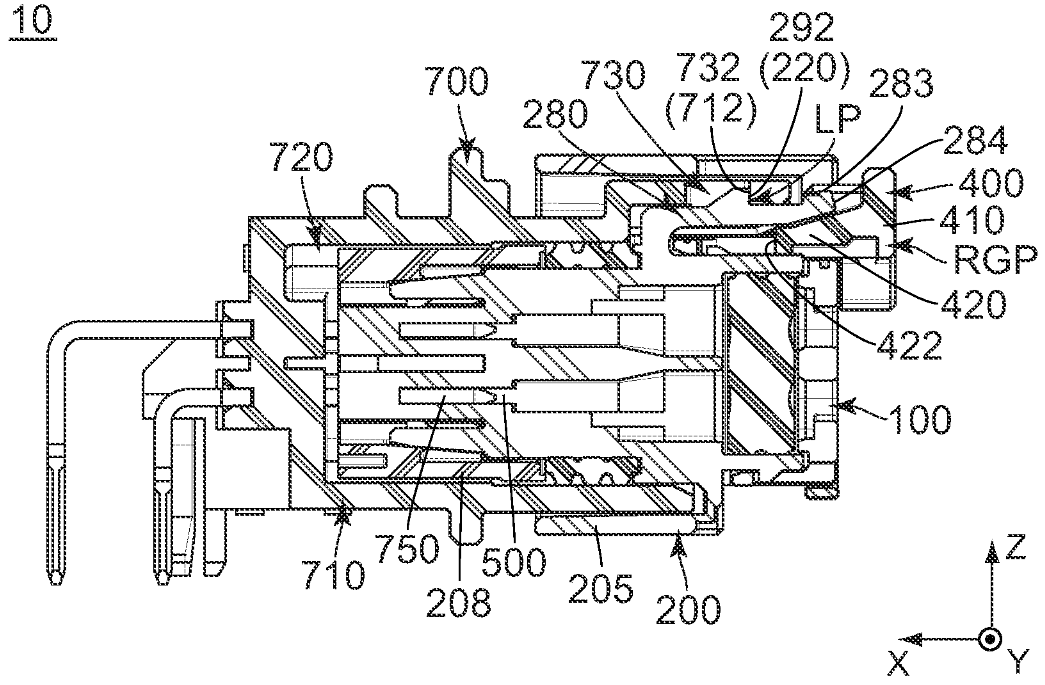
FIG. 16 is a cross-sectional view showing the connector assembly of FIG. 15, taken along line H-H.
Figure 19:
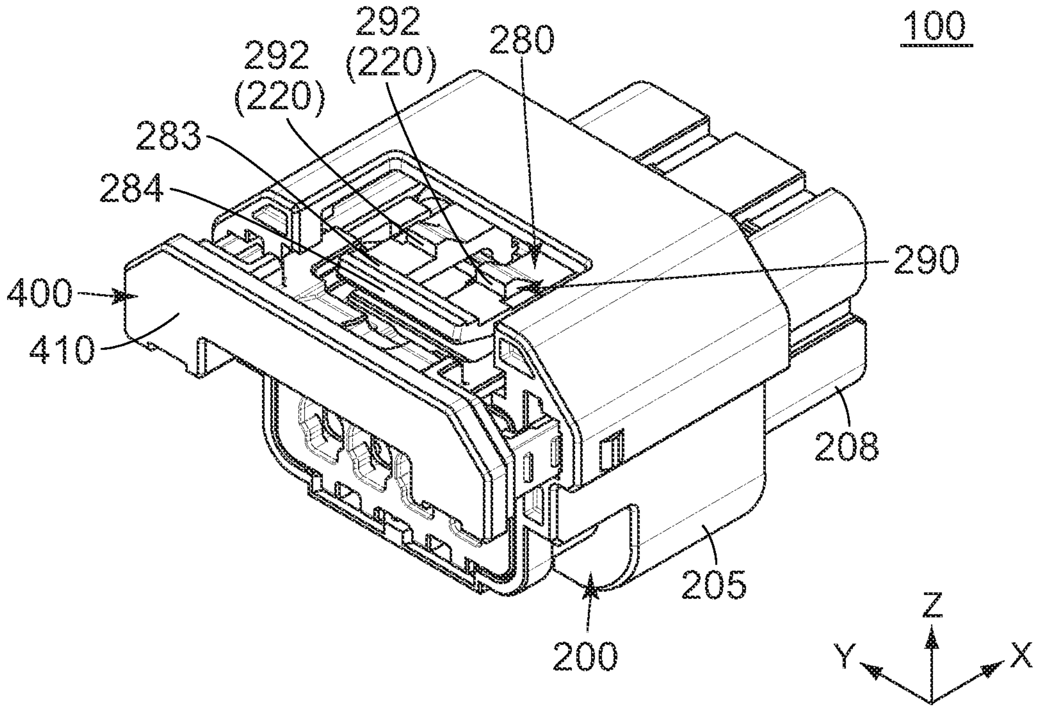
FIG. 19 is a rear, perspective view showing the connector of FIG. 17.
Figure 22:
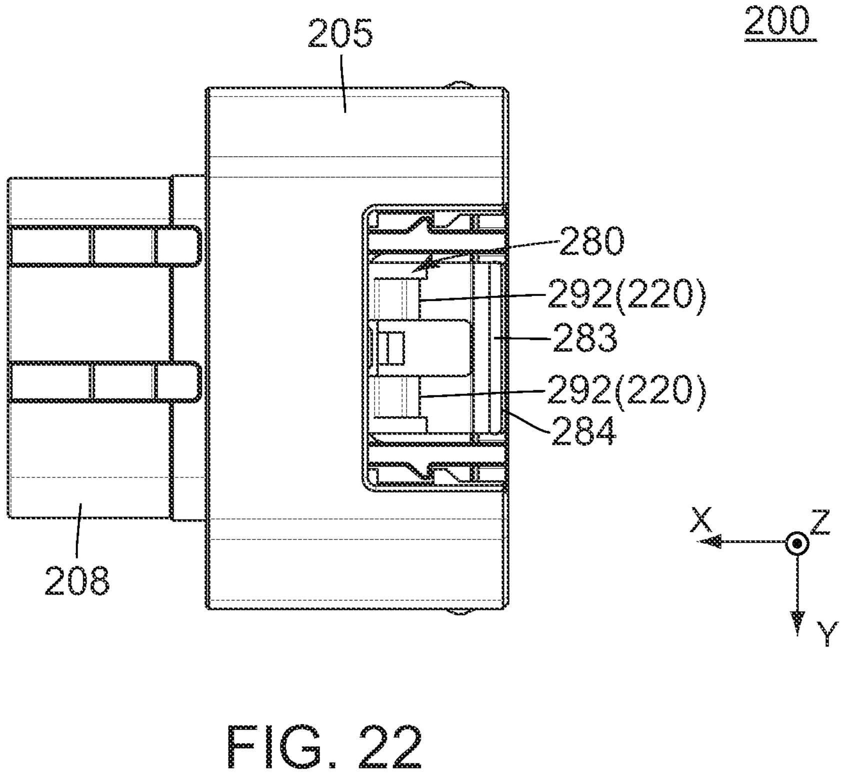
FIG. 22 is a top view showing a housing which is included in the connector of FIG. 20.

As shown in FIG. 16, the housing 200 of the present embodiment is mateable with the mating housing 710 which is positioned forward of the housing 200 in the front-rear direction. As shown in FIG. 22, the housing 200 has a symmetrical shape with respect to a plane which passes through a middle of the housing 200 in the width direction and which is perpendicular to the width direction. Referring to FIGS. 14, 18 and 19, the housing 200 is provided with two repositioning portions 210, two lock portions 220 and four stoppers 240. Though the present invention is not limited thereto, the housing 200 should be provided with at least one repositioning portion 210, one lock portion 220 and one stopper 240.

Figure 2:
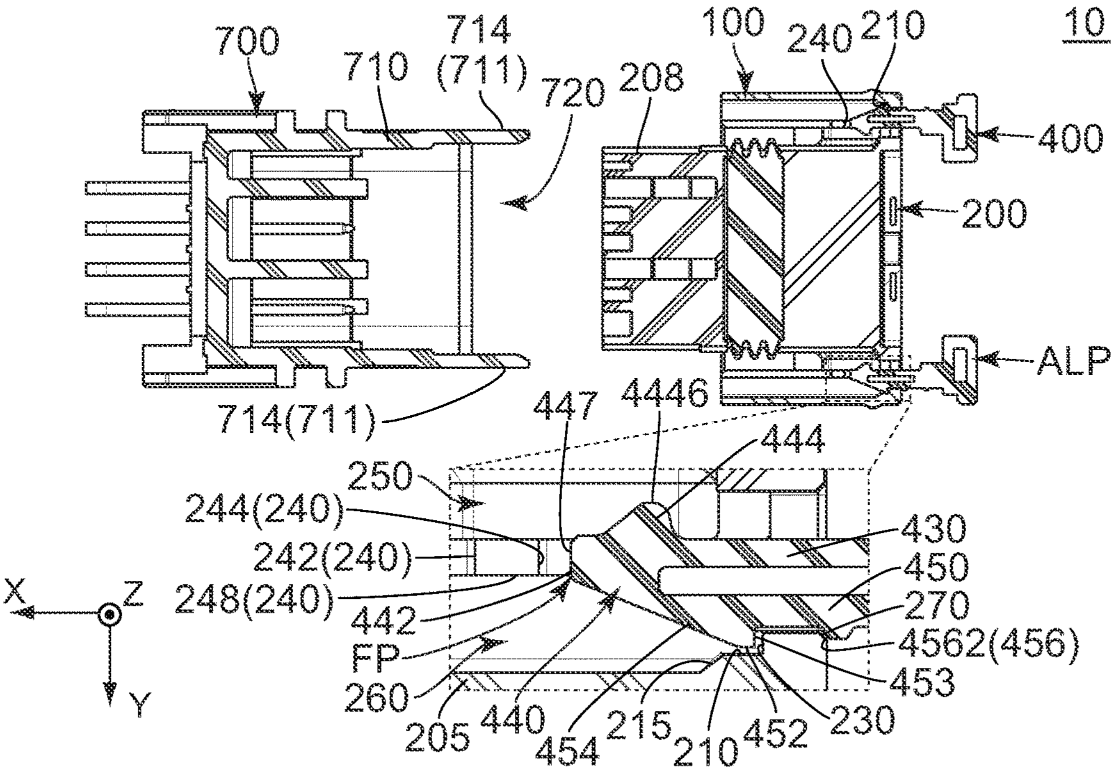
FIG. 2 is a cross-sectional view showing the connector assembly of FIG. 1, taken along line A-A. In the figure, a part of the connector is enlarged and illustrated.
Figure 3:
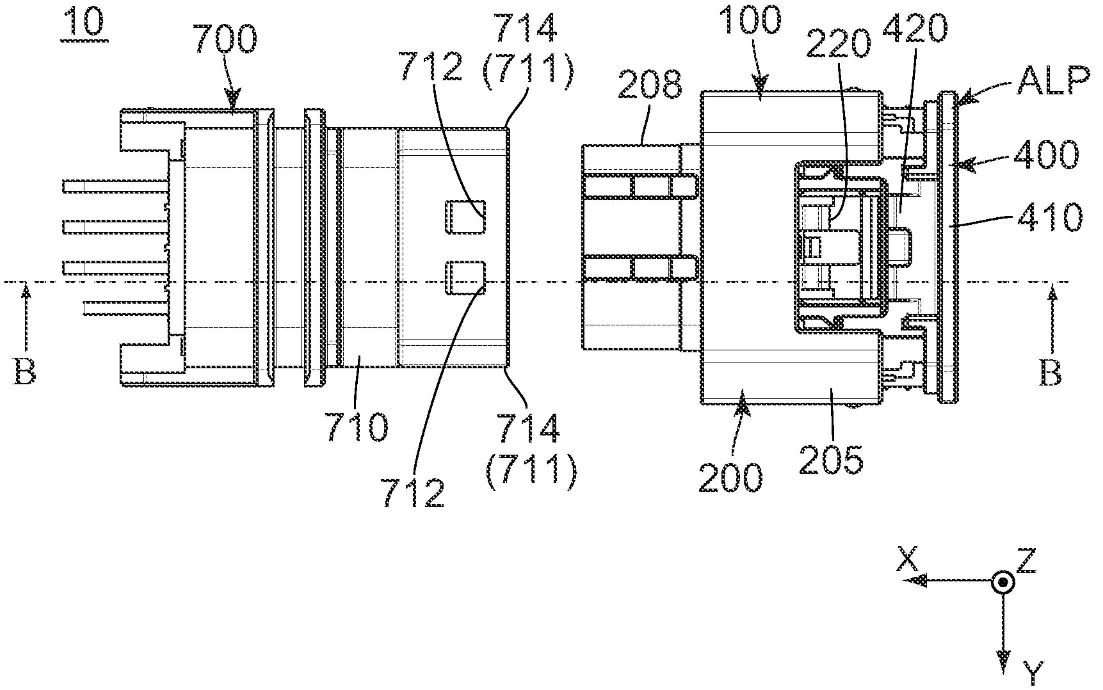
FIG. 3 is a top view showing the connector assembly of FIG. 1.

As shown in FIG. 14, each of the repositioning portions 210 of the present embodiment is bulged in a perpendicular direction perpendicular to the front-rear direction. More specifically, each of the repositioning portions 210 is bulged inward in the width direction. That is, in the present embodiment, the width direction is referred to as the perpendicular direction. However, the present invention is not limited thereto. Specifically, a direction perpendicular to the front-rear direction, such as the up-down direction, may be designated as the perpendicular direction. As shown in FIG. 2, the repositioning portions 210 are positioned at opposite sides, respectively, of the housing 200 in the width direction.

Figure 12:
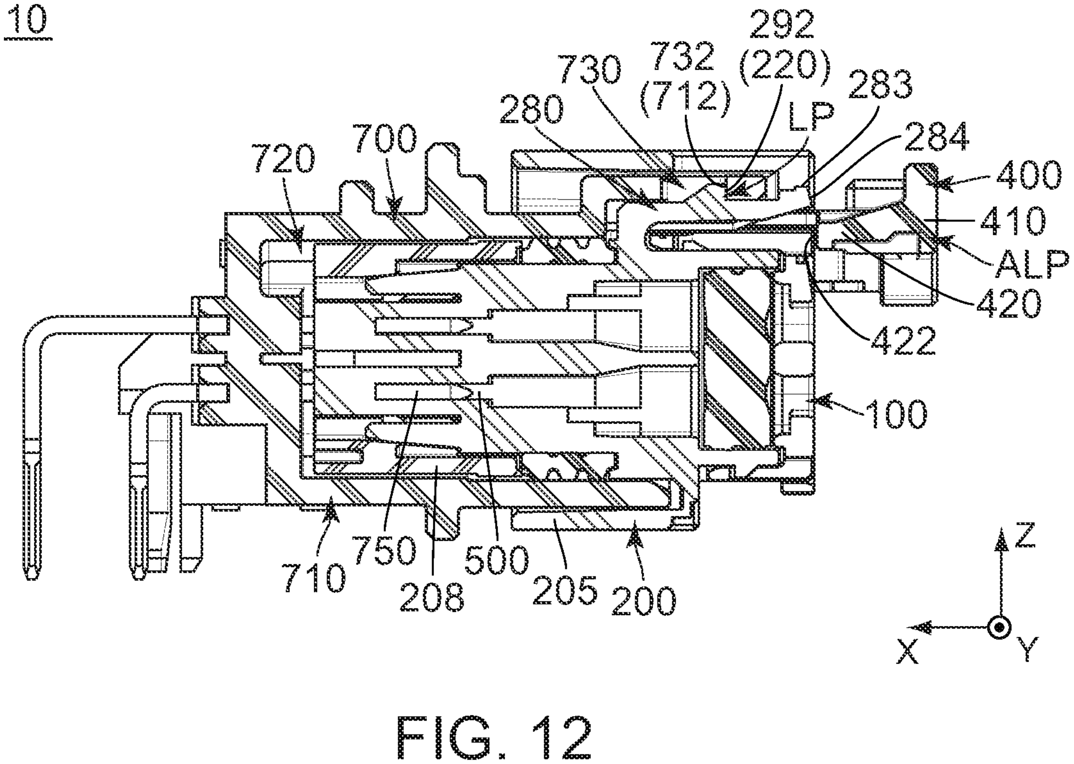
FIG. 12 is a cross-sectional view showing the connector assembly of FIG. 11, taken along line F-F.

As shown in FIGS. 8 and 12, each of the lock portions 220 of the present embodiment is selectively positionable at a lock position LP or at a release position RP. As shown in FIG. 12, when the lock portion 220 is positioned at the lock position LP, the lock portion 220 and the mating lock portion 712 lock a mated state where the housing 200 is mated with the mating housing 710. As shown in FIG. 8, when the lock portion 220 is positioned at the release position RP, the lock portion 220 and the mating lock portion 712 do not lock the mated state of the housing 200 with the mating housing 710. In other words, when the lock portion 220 is positioned at the release position RP, the lock of the mated state of the housing 200 with the mating housing 710 is released.

Figure 21:
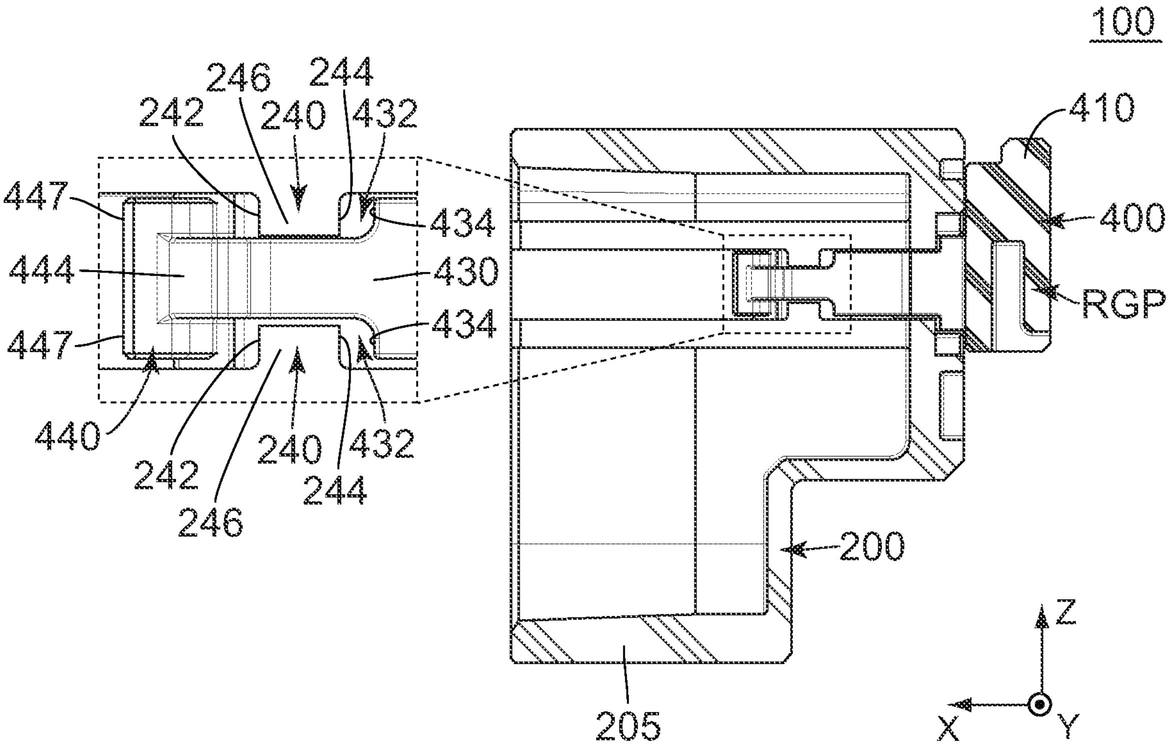
FIG. 21 is a cross-sectional view showing the connector of FIG. 20, taken along line I-I. In the figure, a part of the connector is enlarged and illustrated.

Referring to FIG. 18, each of the stoppers 240 of the present embodiment is positioned around an outer end in the perpendicular direction, or in the width direction, of the housing 200. The four stoppers 240 are grouped into two pairs each consisting of two of the stoppers 240. As shown in FIGS. 18 and 21, each of the stoppers 240 has a front surface 242, a rear surface 244, an inner surface 246 and an outer surface 248.

As shown in FIG. 21, the front surface 242 of the present embodiment faces forward in the front-rear direction. The front surface 242 defines a front end of the stopper 240 in the front-rear direction.

As shown in FIG. 21, the rear surface 244 of the present embodiment faces rearward in the front-rear direction. The rear surface 244 defines a rear end of the stopper 240 in the front-rear direction. The rear surface 244 is perpendicular to the front-rear direction.

As shown in FIG. 21, the inner surface 246 of the present embodiment faces inward in the perpendicular direction, or in the width direction. The inner surface 246 defines an inner end of the stopper 240 in the width direction.

As shown in FIG. 18, the outer surface 248 of the present embodiment faces outward in the perpendicular direction, or in the width direction. The outer surface 248 defines an outer end of the stopper 240 in the width direction.

As shown in FIG. 14, the housing 200 has two slope surfaces 215.

As shown in FIG. 14, each of the slope surfaces 215 of the present embodiment intersects with both the front-rear direction and the width direction. More specifically, each of the slope surfaces 215 is oblique to both the front-rear direction and the width direction. The slope surfaces 215 correspond to the repositioning portions 210, respectively. Each of the slope surfaces 215 is positioned forward of the corresponding repositioning portion 210 in the front-rear direction. The slope surfaces 215 are positioned at the opposite sides, respectively, of the housing 200 in the width direction.

As shown in FIG. 18, the housing 200 is provided with an accommodation portion 250.

Figure 10:
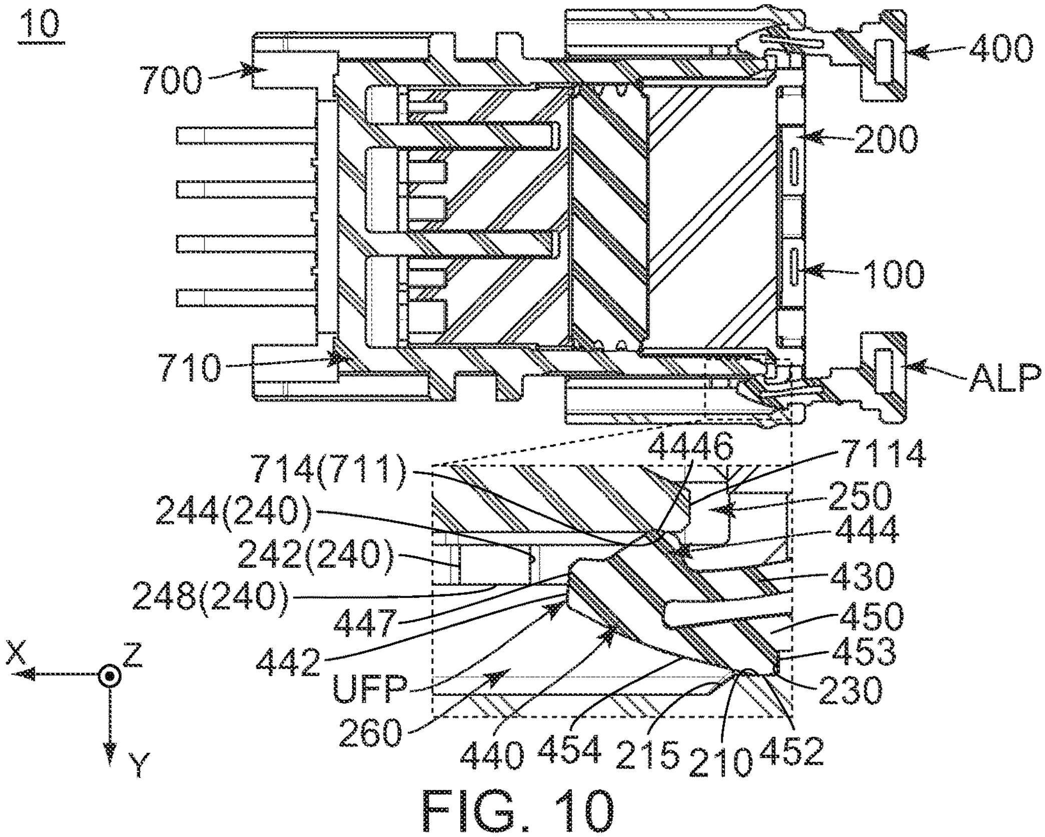
FIG. 10 is a cross-sectional view showing the connector assembly of FIG. 9, taken along line E-E. In the figure, a part of the connector assembly is enlarged and illustrated.

As shown in FIG. 2, the accommodation portion 250 of the present embodiment extends in the front-rear direction. As shown in FIG. 18, the accommodation portion 250 is opened at its front end in the front-rear direction. As shown in FIG. 10, the accommodation portion 250 accommodates the mating end portion 711 when the connector 100 and the mating connector 700 are connected with each other.

Figure 4:
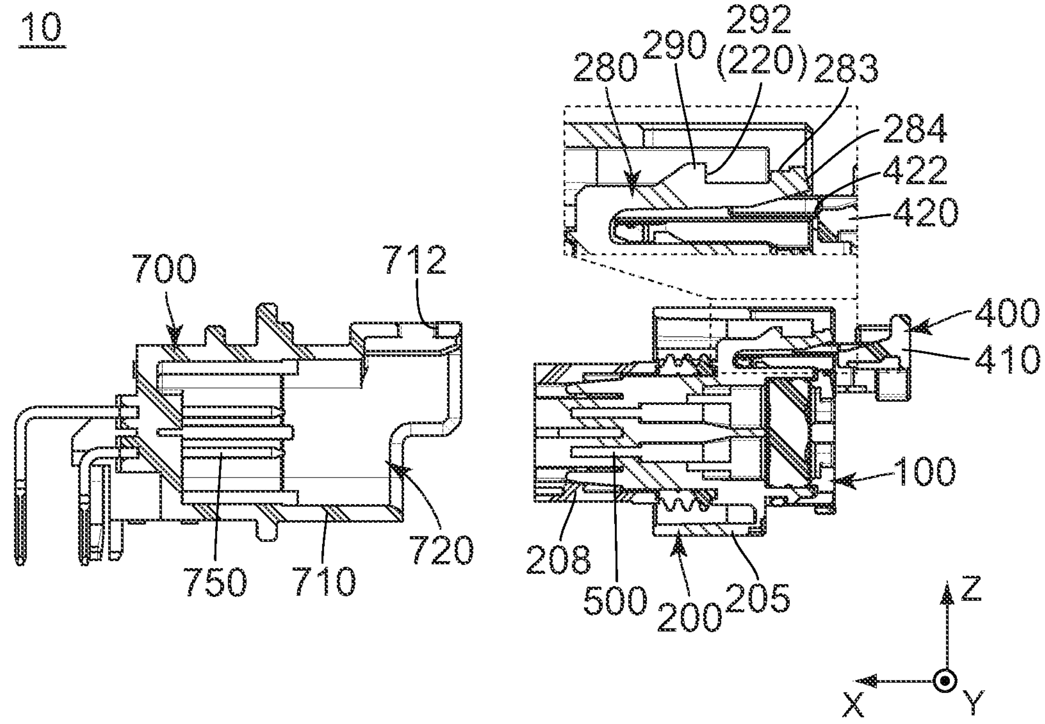
FIG. 4 is a cross-sectional view showing the connector assembly of FIG. 3, taken along line B-B. In the figure, a part of the connector is enlarged and illustrated.
Figure 5:
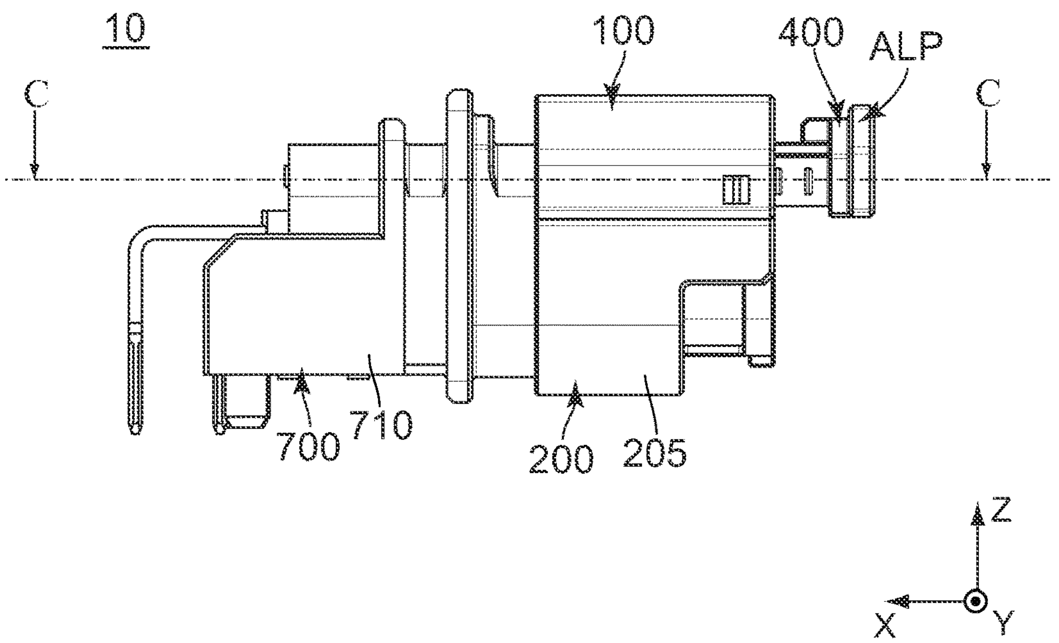
FIG. 5 is another side view showing the connector assembly of FIG. 1. In the figure, the connector assembly is in a half-mated state which is in the middle of their mating process, and the CPA member is positioned at the allowance position.

Referring to FIGS. 4, 14 and 19, the housing 200 has a surrounding portion 205, a mating portion 208, two faced portions 230, two additional accommodation portions 260, two abutment target portions 270, an elastic supporting portion 280 and two protruding portions 290.

As shown in FIG. 18, the surrounding portion 205 of the present embodiment defines outer ends of the connector 100 in directions perpendicular to the front-rear direction. The surrounding portion 205 defines an outer ends of the connector 100 in the up-down direction. The surrounding portion 205 defines an outer end of the connector 100 in the width direction. Each of the stoppers 240 is positioned in the surrounding portion 205. As shown in FIG. 14, the repositioning portions 210, the slope surfaces 215, the faced portions 230 and the abutment target portions 270 are provided on the surrounding portion 205.

Figure 20:
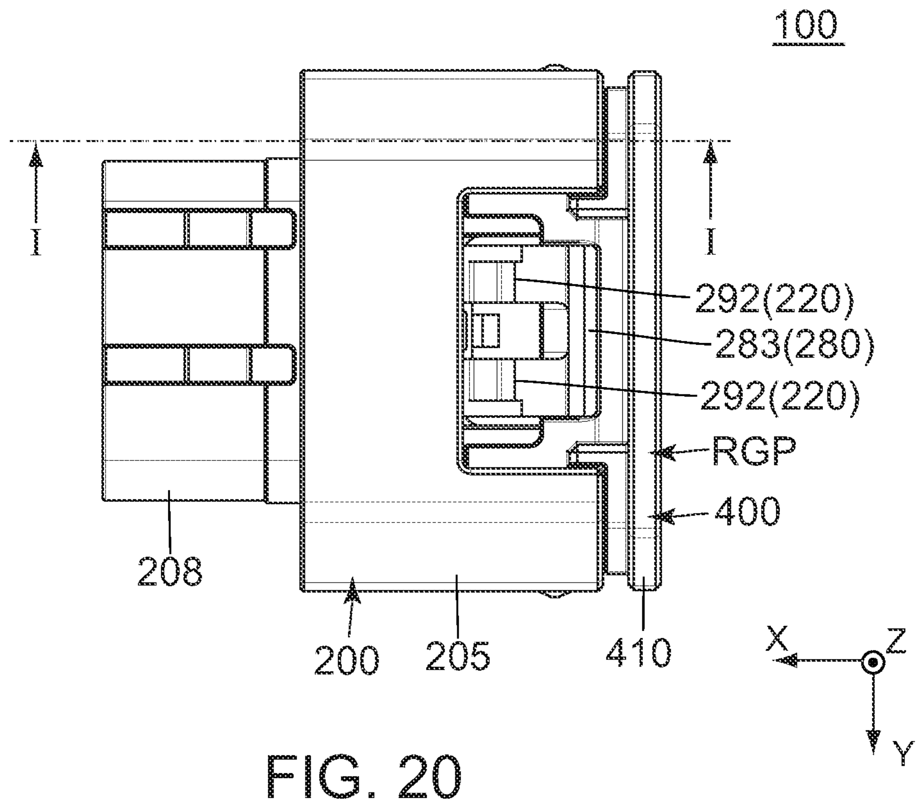
FIG. 20 is a top view showing the connector which is included in the connector assembly of FIG. 15.

As shown in FIG. 20, the mating portion 208 of the present embodiment defines a front end of the connector 100 in the front-rear direction. As shown in FIG. 12, when the connector 100 is connected with the mating connector 700, the mating portion 208 is accommodated in the mating portion accommodating portion 720.

Referring to FIG. 14, each of the faced portions 230 of the present embodiment is positioned around a rear end of the housing 200 in the front-rear direction. Each of the faced portions 230 faces forward in the front-rear direction. The two faced portions 230 are positioned at the opposite sides, respectively, of the housing 200 in the width direction.

As shown in FIG. 2, each of the additional accommodation portions 260 of the present embodiment extends in the front-rear direction. As shown in FIG. 18, each of the additional accommodation portions 260 is opened at its front end in the front-rear direction. Each of the additional accommodation portions 260 is positioned in the surrounding portion 205. Each of the additional accommodation portions 260 is positioned outward of the accommodation portion 250 in the perpendicular direction, or in the width direction. The two additional accommodation portions 260 are positioned at the opposite sides, respectively, of the housing 200 in the width direction.

As shown in FIG. 14, each of the abutment target portions 270 of the present embodiment is positioned at the rear end of the housing 200 in the front-rear direction. Each of the abutment target portions 270 faces rearward in the front-rear direction. The abutment target portions 270 are positioned at the opposite sides, respectively, of the housing 200 in the width direction.

As shown in FIG. 4, the elastic supporting portion 280 of the present embodiment is elastically deformable with its front end acting as a fulcrum. The elastic supporting portion 280 extends upward in the up-down direction and then extends rearward in the front-rear direction. The elastic supporting portion 280 has an operation portion 283 and a free end 284.

As shown in FIG. 4, the operation portion 283 of the present embodiment is positioned at a rear end of the elastic supporting portion 280 in the front-rear direction. When an operator presses the operation portion 283 down, the elastic supporting portion 280 is elastically deformed. When the operator stops pressing the operation portion 283, the elastic supporting portion 280 is restored to its original shape.

As shown in FIG. 4, the free end 284 of the present embodiment defines the rear end of the elastic supporting portion 280 in the front-rear direction.

As shown in FIG. 19, each of the protruding portions 290 of the present embodiment is elastically supported by the elastic supporting portion 280. Each of the protruding portions 290 projects upward in the up-down direction from the elastic supporting portion 280. Each of the protruding portions 290 has a rear surface 292 facing rearward in the front-rear direction. The rear surface 292 functions as the aforementioned lock portion 220.

Figure 11:
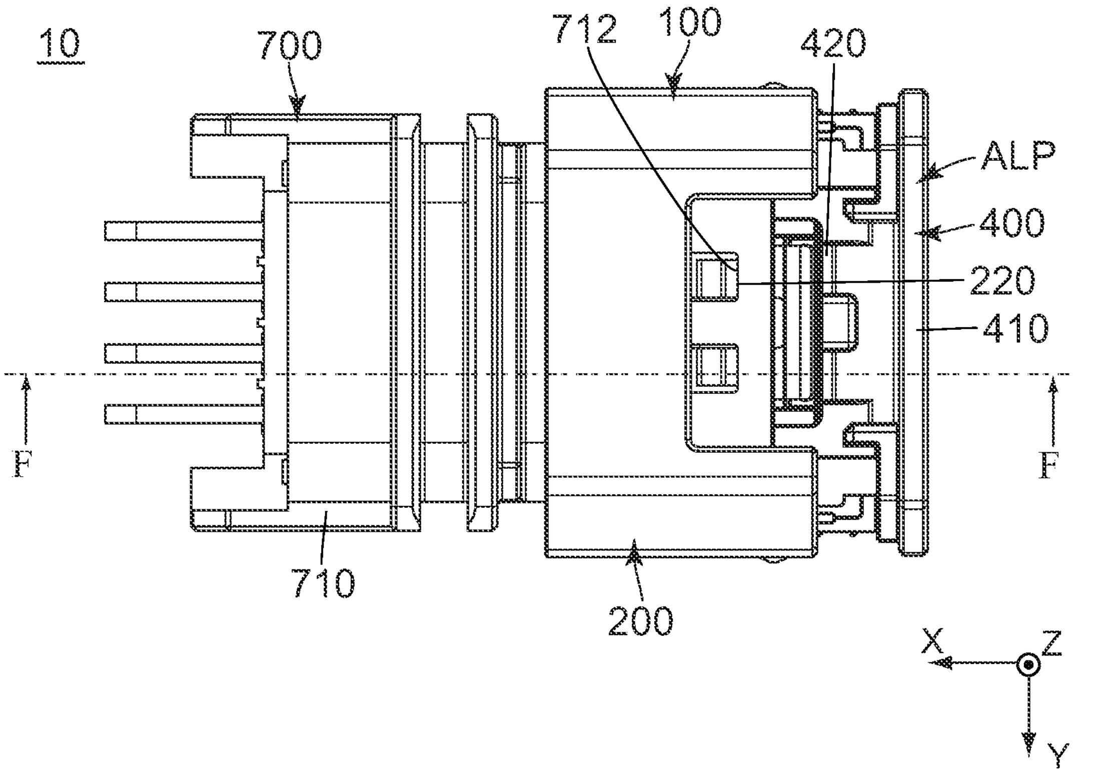
FIG. 11 is a top view showing the connector assembly of FIG. 9.
Figure 15:
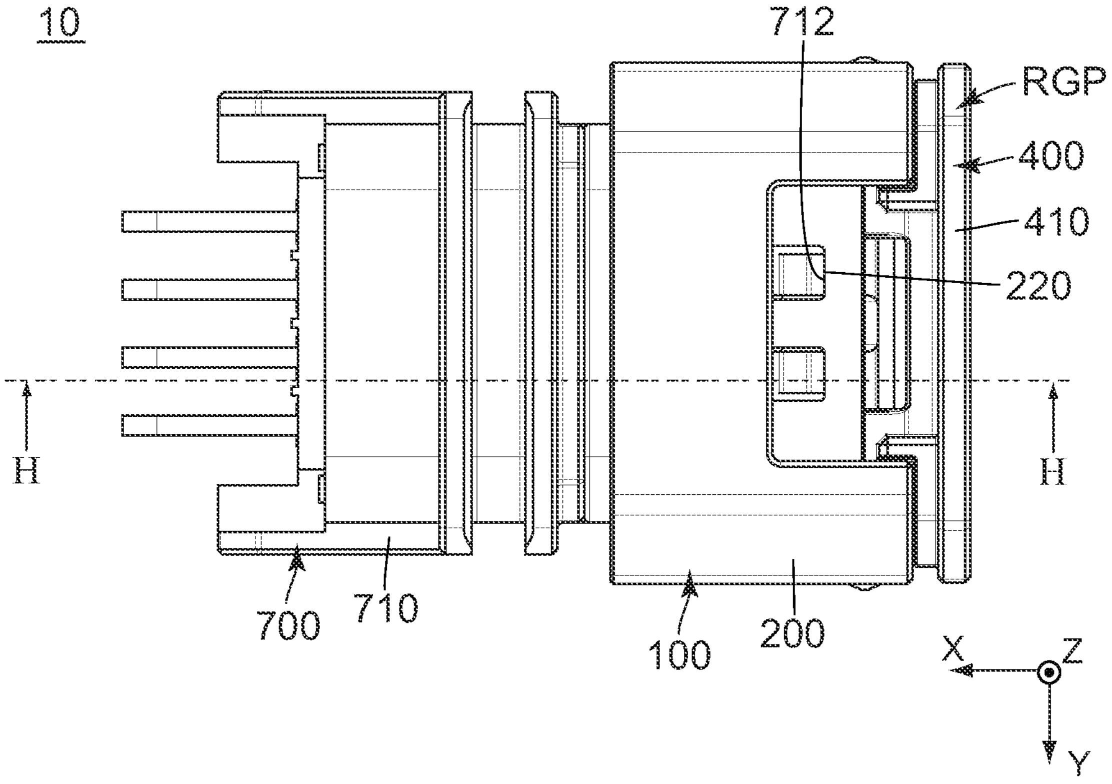
FIG. 15 is a top view showing the connector assembly of FIG. 13.
Figure 28:
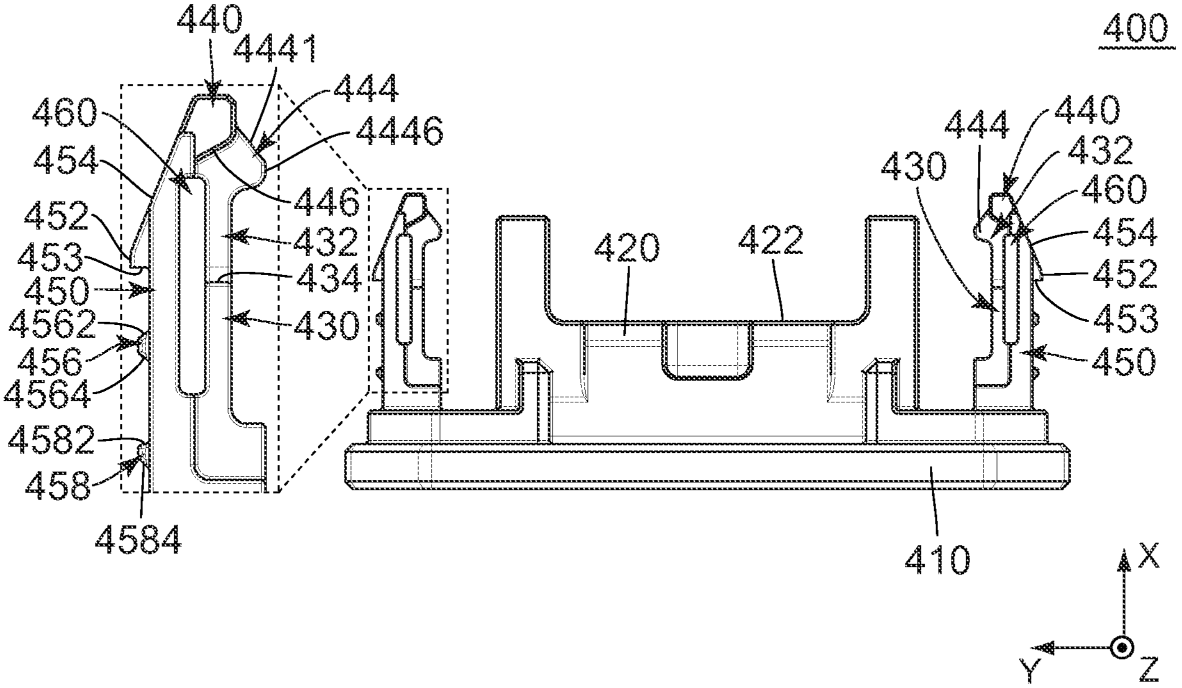
FIG. 28 is a top view showing the CPA member of FIG. 23. In the figure, a part of the CPA member is enlarged and illustrated.
Figure 29:
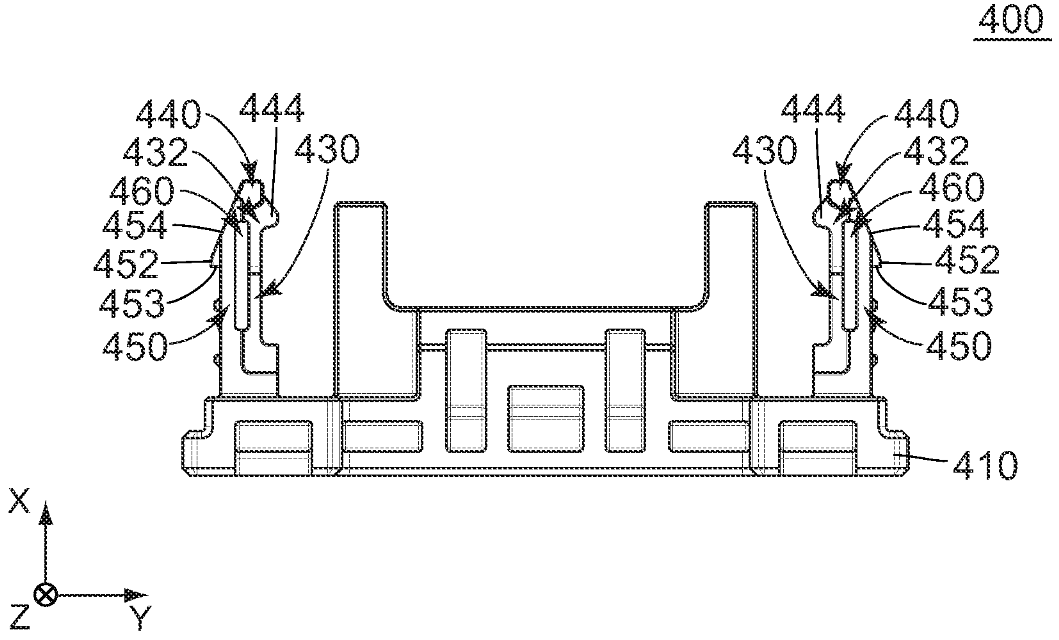
FIG. 29 is a bottom view showing the CPA member of FIG. 23.

Referring to FIGS. 11 and 15, the CPA member 400 of the present embodiment is attached to the housing 200 so as to be movable between a regulation position RGP and an allowance position ALP in the front-rear direction. The allowance position ALP is positioned rearward of the regulation position RGP in the front-rear direction. As shown in FIG. 28, the CPA member 400 has a symmetrical shape with respect to a plane which passes through a middle of the CPA member 400 in the width direction and which is perpendicular to the width direction. The CPA member 400 has a base end portion 410, a regulating portion 420, two first arm portions 430, two distal end portions 440 and two second arm portions 450. The two first arm portions 430, the two distal end portions 440 and the two second arm portions 450 are grouped into two sets each consisting of each one of the first arm portions 430, the distal end portions 440 and the second arm portions 450. However, the present invention is not limited thereto. The CPA member 400 may have only one set consisting of the first arm portion 430, the distal end portion 440 and the second arm portion 450. In other words, the CPA member 400 should have the base end portion 410, the regulating portion 420, the first arm portion 430, the distal end portion 440 and the second arm portion 450.

Referring to FIGS. 2 and 28, the two repositioning portions 210 correspond to the two sets, respectively, each of which consists of the first arm portion 430, the distal end portion 440 and the second arm portion 450. Referring to FIGS. 18 and 28, the two pairs of the stoppers 240 correspond to the two sets, respectively, each of which consists of the first arm portion 430, the distal end portion 440 and the second arm portion 450. Referring to FIGS. 14 and 28, the two sets, each of which consists of the first arm portion 430, the distal end portion 440 and the second arm portion 450, correspond to the two slope surfaces 215, the two faced portions 230, the two additional accommodation portions 260 and the two abutment target portions 270, respectively.

As shown in FIG. 2, a release projection 444 is partially positioned in the accommodation portion 250 when the connector 100 is not connected with the mating connector 700 while the CPA member 400 is positioned at the allowance position ALP. However, the present invention is not limited thereto. Specifically, the connector 100 should be configured so that the release projection 444 is positioned, at least in part, in the accommodation portion 250 when the connector 100 is not connected with the mating connector 700 while the CPA member 400 is positioned at the allowance position ALP.

Referring to FIG. 28, the base end portion 410 of the present embodiment defines a rear end of the CPA member 400 in the front-rear direction. The base end portion 410 couples the two first arm portions 430 with each other. The base end portions 410 couples the two second arm portions 450 with each other. The base end portion 410 couples the first arm portion 430 and the second arm portion 450 of each set with each other.

As shown in FIG. 28, the regulating portion 420 of the present embodiment extends forward in the front-rear direction from the base end portion 410. The regulating portion 420 is positioned around the middle of the CPA member 400 in the width direction. The regulating portion 420 is positioned between the two first arm portions 430. As shown in FIG. 16, when the CPA member 400 is positioned at the regulation position RGP, the regulating portion 420 is positioned just below the operation portion 283 in the up-down direction and regulates the pressing of the operation portion 283. In other words, when the CPA member 400 is positioned at the regulation position RGP, the regulating portion 420 regulates a movement of each of the lock portions 220 from the lock position LP to the release position RP. As shown in FIG. 12, when the CPA member 400 is positioned at the allowance position ALP, the regulating portion 420 is positioned rearward of the operation portion 283 in the front-rear direction and does not regulate the pressing of the operation portion 283. In other words, when the CPA member 400 is positioned at the allowance position ALP, the regulating portion 420 allows the movement of each of the lock portions 220 from the lock position LP to the release position RP. The regulating portion 420 has a front end 422 facing forward in the front-rear direction.

As shown in FIG. 28, the first arm portion 430 of the present embodiment extends forward in the front-rear direction from the base end portion 410. More specifically, the first arm portion 430 extends forward in the front-rear direction from around an outer end of the base end portion 410 in the width direction. The first arm portion 430 is elastically deformable. However, the present invention is not limited thereto; the first arm portion 430 may have no elasticity. As shown in FIG. 21, the first arm portion 430 is provided with two receiving portions 432. The two receiving portions 432 of the first arm portion 430 of each set correspond to the two stoppers 240, respectively, of the corresponding pair. However, the present invention is not limited thereto; the number of the receiving portion 432 may be one.

As shown in FIG. 21, each of the receiving portions 432 of the present embodiment is a recess which is recessed inward in the up-down direction. When the CPA member 400 is positioned at the regulation position RGP, the receiving portion 432 receives, at least in part, the stopper 240.

Figure 23:
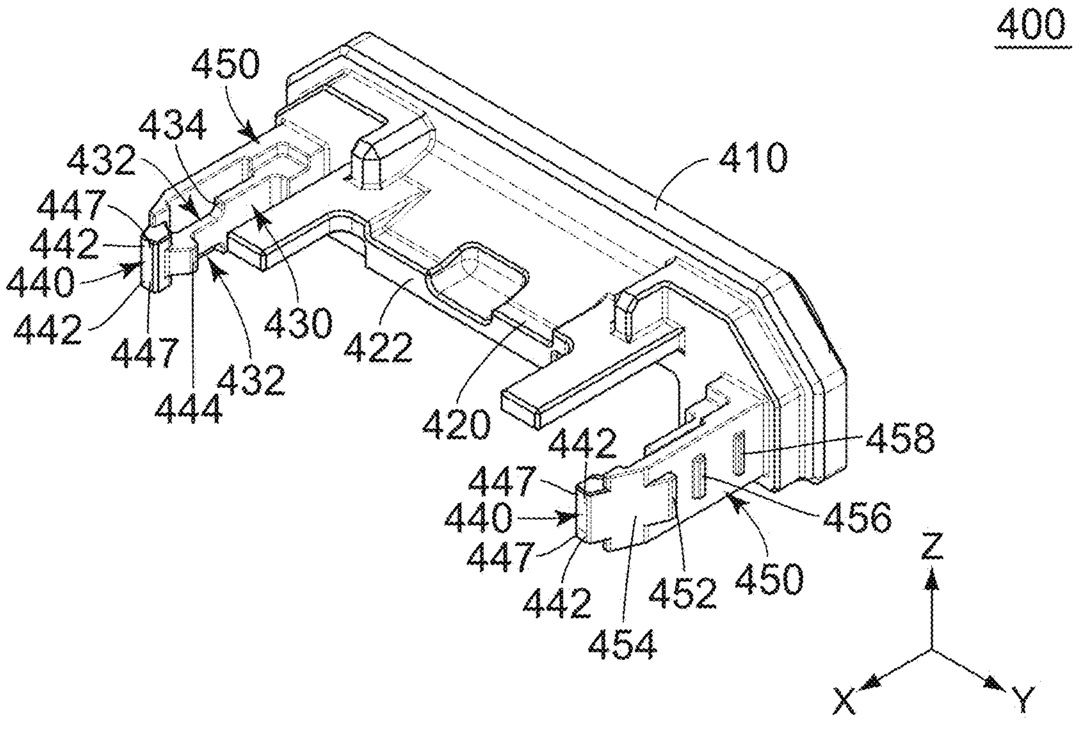
FIG. 23 is a front, perspective view showing the CPA member which is included in the connector of FIG. 17.

As shown in FIG. 23, the first arm portion 430 has edges 434.

As shown in FIG. 23, each of the edges 434 of the present embodiment faces forward in the front-rear direction. Each of the edges 434 faces inward of the receiving portion 432 in the front-rear direction. As shown in FIG. 28, each of the edges 434 is positioned rearward of the distal end portion 440 in the front-rear direction. Each of the edges 434 is positioned rearward of the release projection 444 in the front-rear direction. Each of the edges 434 is positioned around a middle of the first arm portion 430 in the front-rear direction.

Figure 24:
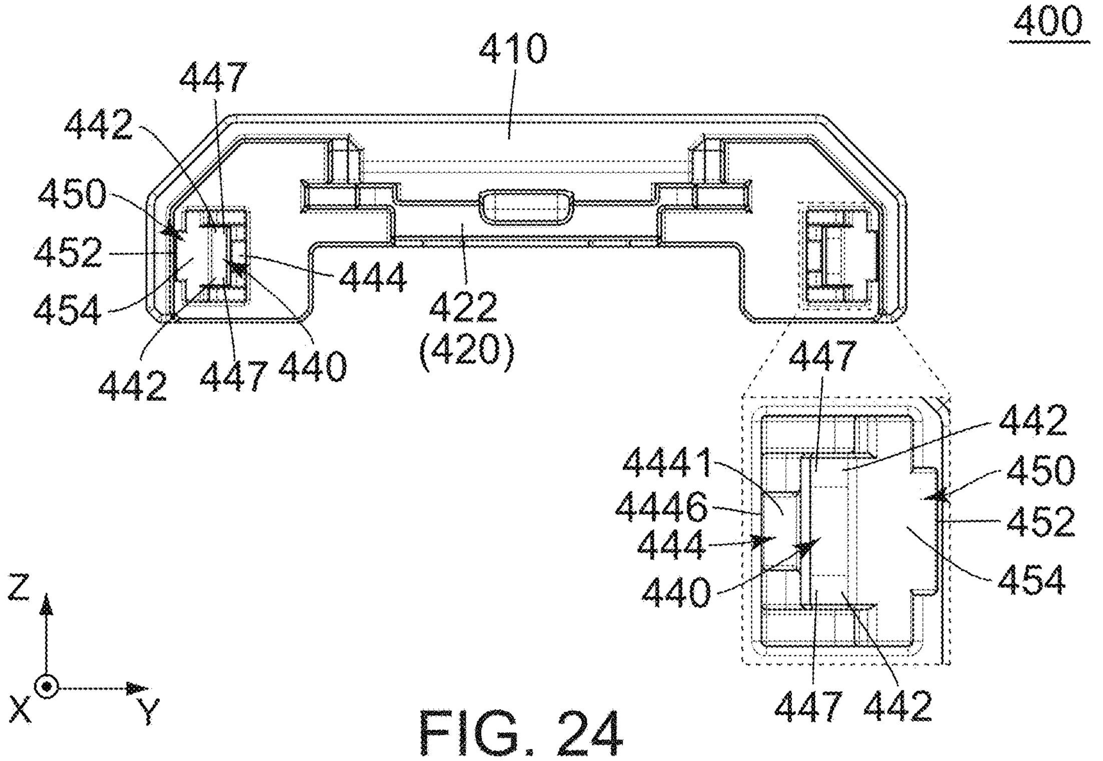
FIG. 24 is a front view showing the CPA member of FIG. 23. In the figure, a part of the CPA member is enlarged and illustrated.
Figure 25:
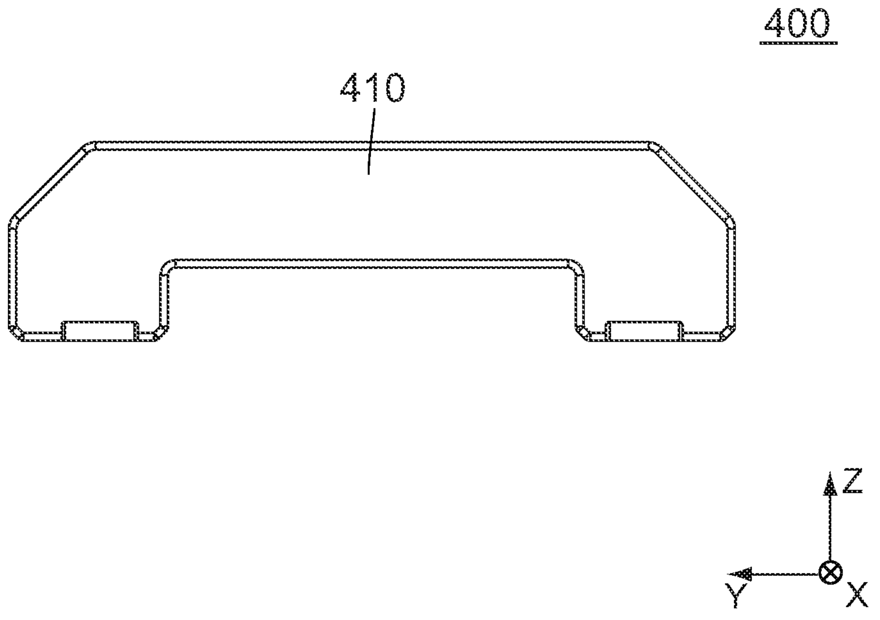
FIG. 25 is a rear view showing the CPA member of FIG. 23.

As shown in FIG. 28, the distal end portion 440 of the present embodiment is supported by the first arm portion 430. The first arm portion 430 extends rearward in the front-rear direction from the distal end portion 440. As shown in FIG. 24, the distal end portion 440 is provided with two abutment portions 442 and two additional abutment portions 447. Referring to FIGS. 21 and 24, the two abutment portions 442 and two additional abutment portions 447 of the distal end portion 440 of each set correspond the two stoppers 240, respectively, of the corresponding pair. However, the present invention is not limited thereto. Specifically, the number of the abutment portion 442 may be one. Additionally, the distal end portion 440 may not be provided with the additional abutment portions 447. In other words, the distal end portion 440 should be provided with the single abutment portion 442.

As shown in FIG. 23, the abutment portion 442 of the present embodiment is a plane intersecting with the front-rear direction. The abutment portion 442 faces forward in the front-rear direction. The abutment portion 442 defines a front end of the CPA member 400 in the front-rear direction.

Referring to FIGS. 2 and 10, the abutment portion 442 is selectively positionable at a facing position FP or at a non-facing position UFP.

As shown in FIG. 2, the abutment portion 442 is positioned at the facing position FP when the connector 100 is not connected with the mating connector 700 while the CPA member 400 is positioned at the allowance position ALP. When the abutment portion 442 is positioned at the facing position FP, the abutment portion 442 is positioned rearward of the stopper 240 in the front-rear direction and faces the stopper 240 in the front-rear direction while a movement of the CPA member 400 from the allowance position ALP to the regulation position RGP is regulated. In more detail, when each of the abutment portions 442 is positioned at the facing position FP, each of the abutment portions 442 of each set is positioned rearward of the corresponding stopper 240 of the corresponding pair in the front-rear direction and faces the corresponding stopper 240 of the corresponding pair in the front-rear direction while the movement of the CPA member 400 from the allowance position ALP to the regulation position RGP is regulated. Specifically, when each of the abutment portions 442 is positioned at the facing position FP, each of the abutment portions 442 of each set is positioned rearward of the rear surface 244 of the corresponding stopper 240 of the corresponding pair in the front-rear direction and faces the rear surface 244 of the corresponding stopper 240 of the corresponding pair in the front-rear direction while the movement of the CPA member 400 from the allowance position ALP to the regulation position RGP is regulated.

As shown in FIG. 10, when the abutment portion 442 is positioned at the non-facing position UFP, the abutment portion 442 does not face the stopper 240 in the front-rear direction while the CPA member 400 is movable from the allowance position ALP to the regulation position RGP. In more detail, when each of the abutment portions 442 is positioned at the non-facing position UFP, each of the abutment portions 442 of each set does not face the corresponding stopper 240 of the corresponding pair in the front-rear direction while the CPA member 400 is movable from the allowance position ALP to the regulation position RGP. Specifically, when each of the abutment portions 442 is positioned at the non-facing position UFP, each of the abutment portions 442 of each set does not face the rear surface 244 of the corresponding stopper 240 of the corresponding pair in the front-rear direction while the CPA member 400 is movable from the allowance position ALP to the regulation position RGP.

As shown in FIG. 23, each of the additional abutment portions 447 of the present embodiment is a plane intersecting with the front-rear direction. Each of the additional abutment portions 447 faces forward in the front-rear direction. As shown in FIG. 24, the two abutment portions 442 and the two additional abutment portions 447 are positioned on the common plane. Each of the additional abutment portions 447 is positioned inward of the corresponding abutment portion 442 in the width direction.

As shown in FIG. 2, when the abutment portion 442 is positioned at the facing position FP, the additional abutment portion 447 is positioned rearward of the stopper 240 in the front-rear direction and faces the stopper 240 in the front-rear direction while the movement of the CPA member 400 from the allowance position ALP to the regulation position RGP is further regulated. In more detail, when each of the abutment portions 442 is positioned at the facing position FP, each of the additional abutment portions 447 of each set is positioned rearward of the corresponding stopper 240 of the corresponding pair in the front-rear direction and faces the corresponding stopper 240 of the corresponding pair in the front-rear direction while the movement of the CPA member 400 from the allowance position ALP to the regulation position RGP is further regulated. Specifically, when each of the abutment portions 442 is positioned at the facing position FP, each of the additional abutment portions 447 of each set is positioned rearward of the rear surface 244 of the corresponding stopper 240 of the corresponding pair in the front-rear direction and faces the rear surface 244 of the corresponding stopper 240 of the corresponding pair in the front-rear direction while the movement of the CPA member 400 from the allowance position ALP to the regulation position RGP is further regulated.

As shown in FIG. 10, when the abutment portion 442 is positioned at the non-facing position UFP, the additional abutment portion 447 is positioned rearward of the stopper 240 in the front-rear direction and faces the stopper 240 in the front-rear direction. In more detail, when each of the abutment portions 442 is positioned at the non-facing position UFP, each of the additional abutment portions 447 of each set is positioned rearward of the corresponding stopper 240 of the corresponding pair in the front-rear direction and faces the corresponding stopper 240 of the corresponding pair in the front-rear direction. Specifically, when each of the abutment portions 442 is positioned at the non-facing position UFP, each of the additional abutment portions 447 of each set is positioned rearward of the rear surface 244 of the corresponding stopper 240 of the corresponding pair in the front-rear direction and faces the rear surface 244 of the corresponding stopper 240 of the corresponding pair in the front-rear direction.

As shown in FIG. 10, when the abutment portion 442 is positioned at the non-facing position UFP, the additional abutment portion 447 is oblique to both the front-rear direction and the perpendicular direction and is inclined relative to the rear surface 244 of the stopper 240. In more detail, when each of the abutment portions 442 is positioned at the non-facing position UFP, each of the additional abutment portions 447 of each set is oblique to both the front-rear direction and the perpendicular direction and is inclined relative to the rear surface 244 of the corresponding stopper 240 of the corresponding pair. This enables that, in a case where the operator intends to move the CPA member 400 from the allowance position ALP to the regulation position RGP when the abutment portion 442 is positioned at the non-facing position UFP, the additional abutment portion 447 abuts against the rear surface 244 of the stopper 240 from behind and is then moved outward in the perpendicular direction and forward in the front-rear direction so that the additional abutment portion 447 rides over the rear surface 244 of the stopper 240. Thus, the movement of the CPA member 400 from the allowance position ALP to the regulation position RGP is not prevented in this case.

As shown in FIG. 28, the distal end portion 440 is provided with the release projection 444.

Figure 6:
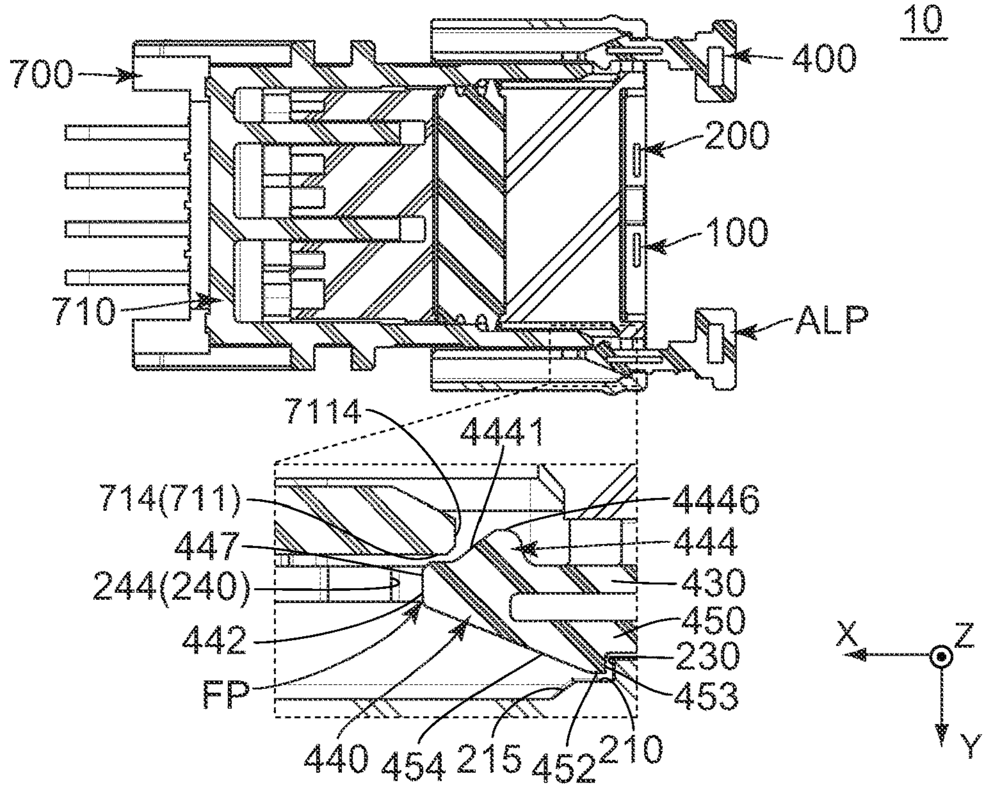
FIG. 6 is a cross-sectional view showing the connector assembly of FIG. 5, taken along line C-C. In the figure, a part of the connector assembly is enlarged and illustrated.
Figure 7:
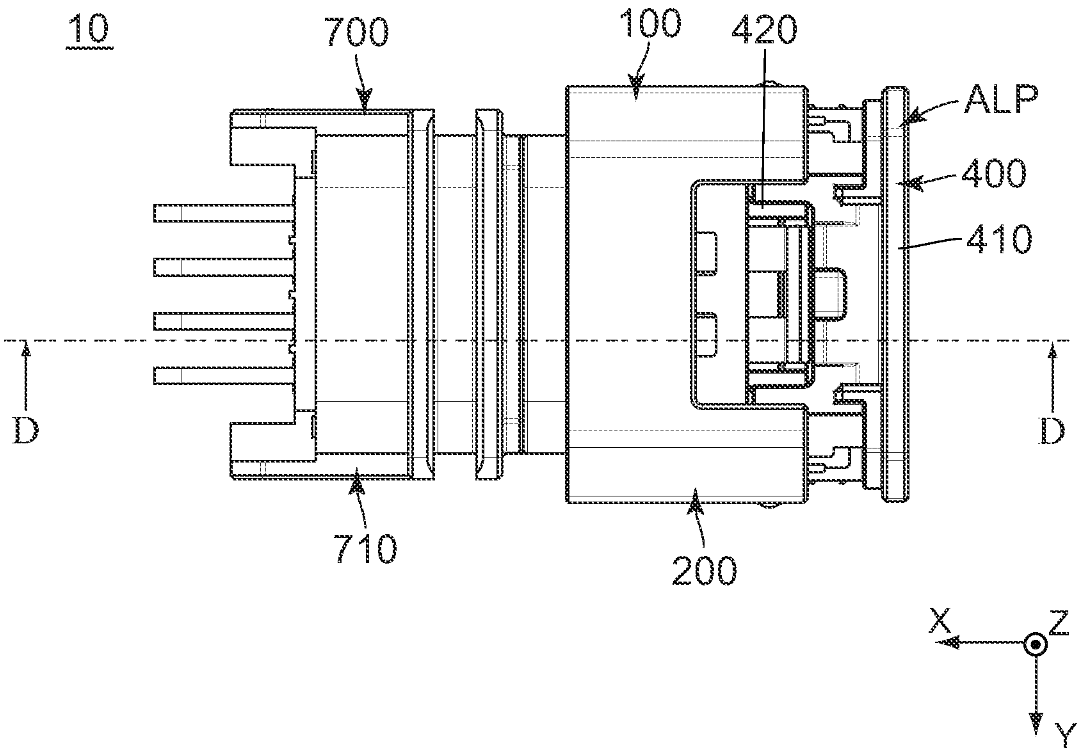
FIG. 7 is a top view showing the connector assembly of FIG. 5.

As shown in FIG. 28, the release projection 444 of the present embodiment projects in the perpendicular direction from the distal end portion 440. Specifically, the release projection 444 projects inward in the perpendicular direction, or in the width direction, from the distal end portion 440. However, the present invention is not limited thereto; the release projection 444 may project outward in the perpendicular direction from the distal end portion 440. Referring to FIGS. 6 and 10, when the connector 100 is mated with the mating connector 700, the release projection 444 is pushed by the mating release portion 714 and the abutment portion 442 is moved to the non-facing position UFP from the facing position FP thereby.

As shown in FIG. 28, the release projection 444 of the present embodiment has an inclined surface 4441 and an inner end 4446.

As shown in FIG. 28, the inclined surface 4441 of the present embodiment defines a front end of the release projection 444 in the front-rear direction. The inclined surface 4441 intersects with both the front-rear direction and the perpendicular direction. In more detail, the inclined surface 4441 is oblique to both the front-rear direction and the width direction. The inclined surface 4441 extends forward in the front-rear direction and outward in the width direction from the inner end 4446.

As shown in FIG. 28, the inner end 4446 of the present embodiment is the innermost end of the release projection 444 in the perpendicular direction, or in the width direction.

As shown in FIG. 28, the distal end portion 440 has a slanted surface 446.

As shown in FIG. 28, the slanted surface 446 of the present embodiment faces rearward in the front-rear direction and inward in the width direction. The slanted surface 446 is positioned forward of the receiving portion 432 in the front-rear direction. The slanted surface 446 is positioned forward of the inner end 4446 of the release projection 444 in the front-rear direction.

As shown in FIG. 28, each of the second arm portions 450 of the present embodiment extends forward in the front-rear direction from the base end portion 410. More specifically, each of the second arm portions 450 extends forward in the front-rear direction from around the outer end of the base end portion 410 in the width direction. The second arm portion 450 is coupled with the distal end portion 440. The second arm portion 450 is positioned outward of the first arm portion 430 in the perpendicular direction, or in the width direction. Each of the second arm portions 450 is elastically deformable. However, the present invention is not limited thereto; the second arm portion 450 may have no elasticity. As shown in FIG. 10, when the CPA member 400 is positioned at the allowance position ALP, the second arm portion 450 is positioned away from the first arm portion 430 in the perpendicular direction and is positioned between the release projection 444 and the repositioning portion 210 in the perpendicular direction. However, the present invention is not limited thereto. Specifically, the connector 100 should be configured so that, at least when the CPA member 400 is positioned at the allowance position ALP, the second arm portion 450 is positioned away from the first arm portion 430 in the perpendicular direction and is positioned between the release projection 444 and the repositioning portion 210 in the perpendicular direction.

Figure 26:
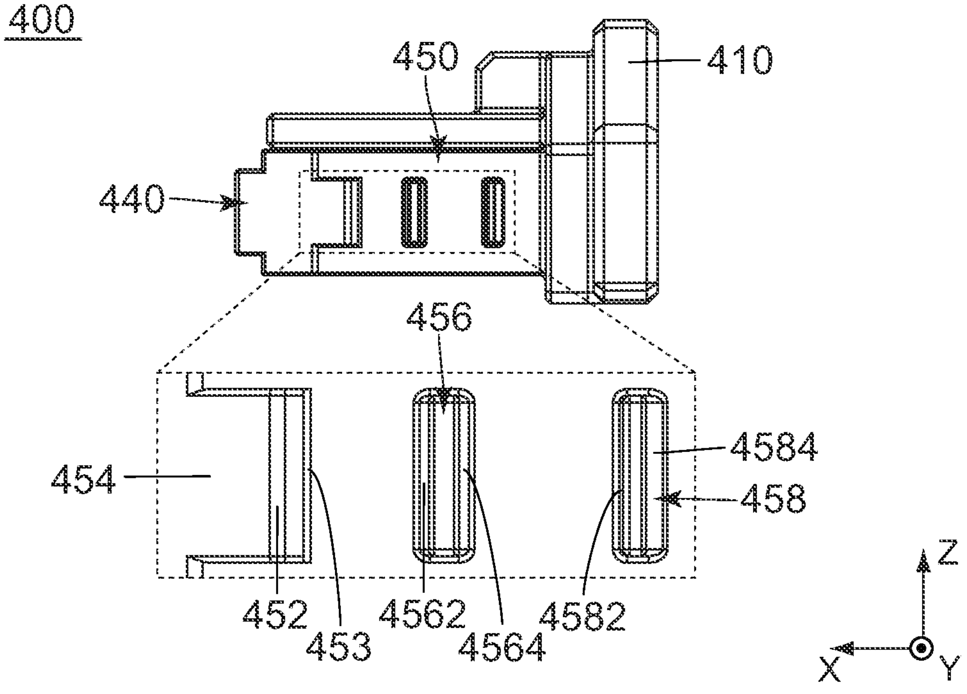
FIG. 26 is a side view showing the CPA member of FIG. 23. In the figure, a part of the CPA member is enlarged and illustrated.
Figure 27:
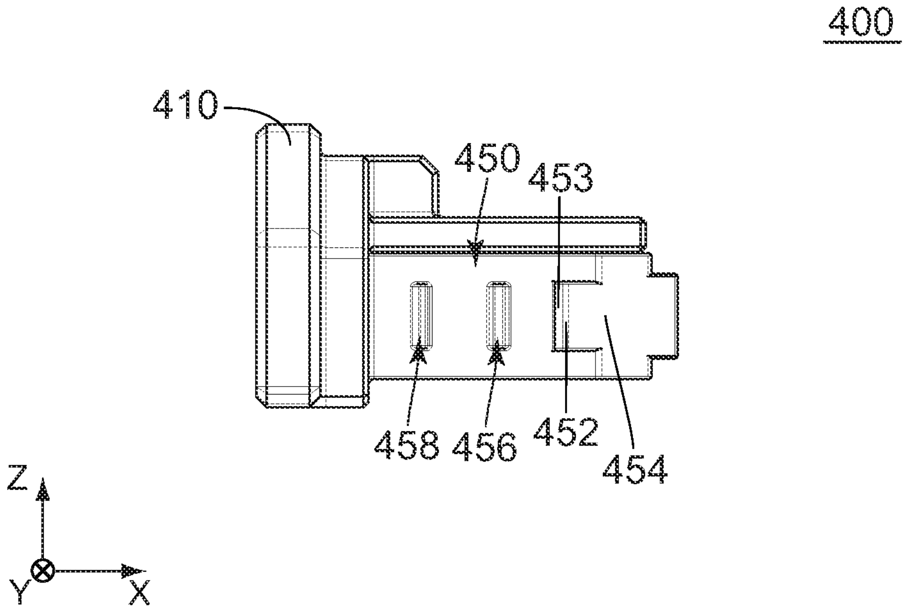
FIG. 27 is another side view showing the CPA member of FIG. 23.

As shown in FIGS. 26 and 27, each of the second arm portions 450 is provided with a pressed portion 452 and a transmission portion 454.

As shown in FIG. 28, the pressed portion 452 of the present embodiment faces outward in the perpendicular direction, or in the width direction. The pressed portion 452 defines an outer end of the second arm portion 450 in the width direction. The pressed portion 452 is positioned rearward of the release projection 444 in the front-rear direction. The pressed portion 452 is positioned forward of the edges 434 of the first arm portion 430 in the front-rear direction.

As shown in FIG. 28, the transmission portion 454 of the present embodiment is positioned forward of the pressed portion 452 in the front-rear direction. The transmission portion 454 is coupled with the pressed portion 452. The transmission portion 454 is coupled with the distal end portion 440.

As shown in FIG. 28, the second arm portion 450 of the present embodiment has a facing portion 453, a first protrusion portion 456 and a second protrusion portion 458.

As shown in FIG. 28, the facing portion 453 of the present embodiment faces rearward in the front-rear direction. The facing portion 453 intersects with the front-rear direction. The facing portion 453 is positioned between the pressed portion 452 and the first protrusion portion 456 in the front-rear direction. The facing portion 453 is positioned rearward of the pressed portion 452 in the front-rear direction. The facing portion 453 is positioned forward of the first protrusion portion 456 in the front-rear direction. The facing portion 453 is positioned rearward of the release projection 444 in the front-rear direction. The facing portion 453 is positioned forward of the edges 434 of the first arm portion 430 in the front-rear direction.

As shown in FIG. 28, the first protrusion portion 456 of the present embodiment projects outward in the perpendicular direction, or in the width direction. The first protrusion portion 456 is positioned between the pressed portion 452 and the second protrusion portion 458 in the front-rear direction. The first protrusion portion 456 is positioned rearward of the pressed portion 452 in the front-rear direction. The first protrusion portion 456 is positioned forward of the second protrusion portion 458 in the front-rear direction. As shown in FIG. 2, when the CPA member 400 is positioned at the allowance position ALP, the first protrusion portion 456 is positioned rearward of the housing 200 in the front-rear direction. More specifically, when the CPA member 400 is positioned at the allowance position ALP, the first protrusion portion 456 is positioned rearward of the abutment target portion 270 in the front-rear direction. As shown in FIG. 26, the first protrusion portion 456 has a front surface 4562 and a rear surface 4564.

As shown in FIG. 28, the front surface 4562 of the present embodiment defines a front end of the first protrusion portion 456 in the front-rear direction. The front surface 4562 faces forward in the front-rear direction and outward in the width direction. The front surface 4562 is oblique to both the front-rear direction and the width direction.

As shown in FIG. 28, the rear surface 4564 of the present embodiment defines a rear end of the first protrusion portion 456 in the front-rear direction. The rear surface 4564 faces rearward in the front-rear direction and outward in the width direction. The rear surface 4564 is oblique to both the front-rear direction and the width direction.

As shown in FIG. 28, the second protrusion portion 458 of the present embodiment projects outward in the perpendicular direction, or in the width direction. The second protrusion portion 458 is positioned rearward of the first protrusion portion 456 in the front-rear direction. Referring to FIGS. 2 and 28, when the CPA member 400 is positioned at the allowance position ALP, the second protrusion portion 458 is positioned rearward of the housing 200 in the front-rear direction. As shown in FIG. 26, the second protrusion portion 458 has a front surface 4582 and a rear surface 4584.

As shown in FIG. 28, the front surface 4582 of the present embodiment defines a front end of the second protrusion portion 458 in the front-rear direction. The front surface 4582 faces forward in the front-rear direction and outward in the width direction. The front surface 4582 is oblique to both the front-rear direction and the width direction.

As shown in FIG. 28, the rear surface 4584 of the present embodiment defines a rear end of the second protrusion portion 458 in the front-rear direction. The rear surface 4584 faces rearward in the front-rear direction and outward in the width direction. The rear surface 4584 is oblique to both the front-rear direction and the width direction.

As shown in FIG. 28, the CPA member 400 has two spaces 460. The space 460 is positioned between the first arm portion 430 and the second arm portion 450. More specifically, the two sets, each of which consists of the first arm portion 430, the distal end portion 440 and the second arm portion 450, correspond to the two spaces 460, respectively, and each of the spaces 460 is positioned between the first arm portion 430 and the second arm portion 450 of the corresponding set in the width direction.

Referring to FIG. 18, each of the terminals 500 of the present embodiment is made of metal. The terminals 500 are held by the mating portion 208 of the housing 200.

Hereinafter, a detailed description will be made about movements and states of components of the connector 100 and the mating connector 700 when the connector 100 is mated with the mating connector 700.

First, referring to FIG. 1, the connector 100 is arranged forward of the mating connector 700 in the front-rear direction. From this state, the connector 100 is moved forward relative to the mating connector 700. Then, the mating portion 208 of the connector 100 is accommodated in the mating portion accommodating portion 720 of the mating connector 700, and the mating end portion 711 of the mating connector 700 is accommodated in the accommodation portion 250 of the connector 100. Thus, the connector assembly 10 changes its state into a half-mated state shown in each of FIGS. 5 to 8, wherein the half-mated state is in the middle of their mating process.

Referring to FIG. 8, in the half-mated state, each of the protruding portions 290 of the connector 100 is pushed and moved downward by an inner surface of the mating end portion 711 of the mating connector 700, and the elastic supporting portion 280 is elastically deformed, and thereby each of the lock portions 220 is positioned at the release position RP. In the half-mated state, the free end 284 of the elastic supporting portion 280 is positioned forward of the front end 422 of the regulating portion 420 in the front-rear direction and faces the front end 422 of the regulating portion 420 in the front-rear direction.

Referring to FIG. 6, in the half-mated state, the rear end 7114 of the mating end portion 711 of the mating connector 700 is positioned rearward of the abutment portion 442 in the front-rear direction and is positioned forward of the inclined surface 4441 of the release projection 444 in the front-rear direction. In the half-mated state, the rear end 7114 of the mating end portion 711 of the mating connector 700 is in non-contact with the inclined surface 4441 of the release projection 444. In the half-mated state, the pressed portion 452 of the second arm portion 450 is in non-contact with the repositioning portion 210 of the housing 200 while the facing portion 453 of the second arm portion 450 is in non-contact with the faced portion 230 of the housing 200. In the half-mated state, the abutment portion 442 is positioned at the facing position FP. In the half-mated state, the abutment portion 442 is positioned rearward of the stopper 240 in the front-rear direction and faces the stopper 240 in the front-rear direction while the movement of the CPA member 400 from the allowance position ALP to the regulation position RGP is regulated. In more detail, in the half-mated state, the abutment portion 442 is positioned rearward of the rear surface 244 of the stopper 240 in the front-rear direction and faces the rear surface 244 of the stopper 240 in the front-rear direction while the movement of the CPA member 400 from the allowance position ALP to the regulation position RGP is regulated.

From the half-mated state, the connector 100 is further moved forward relative to the mating connector 700. Then, the mating lock portion 712 of the mating connector 700 reaches a position same as a position of the lock portion 220 of the connector 100 in the front-rear direction, while the rear end 7114 of the mating end portion 711 of the mating connector 700 is brought into contact with the inclined surface 4441 of the release projection 444 and the release projection 444 is moved outward in the width direction thereby. Accordingly, the lock portion 220 is moved from the release position RP to the lock position LP, while the abutment portion 442 is moved from the facing position FP to the non-facing position UFP. Thus, the connector assembly 10 changes its state into the mated state shown in each of FIGS. 9 to 12.

As described above, the connector 100 of the present embodiment has the CPA function and also is mateable with the existing mating connector 700 which is not particularly designed for the CPA function.

Referring to FIG. 10, when the connector assembly 10 changes its state from the half-mated state to the mated state, the mating end portion 711 of the mating connector 700 is brought into contact with the inner end 4446 of the release projection 444 and each of the first arm portion 430 and the second arm portion 450 is elastically deformed outward in the perpendicular direction, or in the width direction.

As shown in FIG. 12, in the mated state, the lock portion 220 and the mating lock portion 712 lock the mated state where the housing 200 is mated with the mating housing 710. In the mated state, the free end 284 of the elastic supporting portion 280 is positioned forward of the front end 422 of the regulating portion 420 in the front-rear direction and does not face the front end 422 of the regulating portion 420 in the front-rear direction. In the mated state, the terminals 500 of the connector 100 are connected with the mating terminals 750, respectively, of the mating connector 700.

As shown in FIG. 10, in the mated state, the second arm portion 450 is positioned away from the first arm portion 430 in the perpendicular direction and is positioned between the release projection 444 and the repositioning portion 210 in the perpendicular direction, or in the width direction. In the mated state, the abutment portion 442 is positioned at the non-facing position UFP. In the mated state, the abutment portion 442 does not face the stopper 240 in the front-rear direction while the CPA member 400 is movable from the allowance position ALP to the regulation position RGP.

As shown in FIG. 10, in the mated state, the additional abutment portion 447 is positioned rearward of the rear surface 244 of the stopper 240 in the front-rear direction and faces the rear surface 244 of the stopper 240 in the front-rear direction. In the mated state, the additional abutment portion 447 is oblique to both the front-rear direction and the perpendicular direction and is inclined to the rear surface 244 of the stopper 240.

From the mated state, the CPA member 400 is moved forward relative to the housing 200. Then, the additional abutment portion 447 abuts against the rear surface 244 of the stopper 240 from behind. After that, the CPA member 400 is further moved forward relative to the housing 200. Then, the additional abutment portion 447 of the distal end portion 440 is moved outward in the width direction and forward in the front-rear direction so that the additional abutment portion 447 rides over the rear surface 244 of the stopper 240, and the additional abutment portion 447 rides on the outer surface 248 of the stopper 240. From this state, the CPA member 400 is further moved forward relative to the housing 200. Then, the additional abutment portion 447 of the distal end portion 440 rides over the stopper 240 and is moved forward beyond the front surface 242 of the stopper 240, and the stopper 240 is received in the receiving portion 432 of the first arm portion 430. Accordingly, the CPA member 400 is moved from the allowance position ALP to the regulation position RGP, and the connector assembly 10 changes its state into a mating assurance state shown in each of FIGS. 13 to 16. In other words, the connection of the connector 100 with the mating connector 700 is completed. During a process where the connector assembly 10 changes its state from the mated state to the mating assurance state, each of the first protrusion portion 456 and the second protrusion portion 458 of the second arm portion 450 rides over the abutment target portion 270 of the housing 200 and is moved into the additional accommodation portion 260. Accordingly, during the process where the connector assembly 10 changes its state from the mated state to the mating assurance state, the operator of the CPA member 400 can feel clicking sensations which are produced when the first protrusion portion 456 and the second protrusion portion 458 ride over the abutment target portion 270. This enables the operator of the CPA member 400 to properly recognize the changing of the state of the connector assembly 10 to the mating assurance state.

As shown in FIG. 16, in the mating assurance state, the regulating portion 420 regulates the movement of each of the lock portions 220 from the lock position LP to the release position RP. Referring to FIGS. 14 and 21, in the mating assurance state, the receiving portion 432 receives, at least in part, the stopper 240. Referring to FIGS. 21 and 28, in the mating assurance state, the stopper 240 is positioned between the slanted surface 446 and the edge 434 in the front-rear direction. Specifically, in the mating assurance state, the stopper 240 is positioned rearward of the slanted surface 446 and forward of the edge 434 in the front-rear direction. As shown in FIG. 14, in the mating assurance state, the second protrusion portion 458 is positioned forward of the faced portion 230 in the front-rear direction and faces the faced portion 230 in the front-rear direction.

As described above, the mating housing 710 does not have a recess that is recessed inward in the width direction in the vicinity of any of the mating release portions 714. Accordingly, in the mating assurance state, the release projection 444 of the connector 100 continues to receive an external force from the mating end portion 711 of the mating connector 700 while being brought into contact with the mating end portion 711 in the perpendicular direction, or in the width direction, and the first arm portion 430 of the connector 100 continues to be deformed outward in the perpendicular direction, or in the width direction. In the mating assurance state, the continuation of the deformation may cause a plastic deformation of the first arm portion 430 and thereby may cause a permanent distortion of the first arm portion 430. It is noted that, in the mating assurance state, there is little risk of a plastic deformation of the second arm portion 450 of the connector 100 because the second arm portion 450 is generally restored to its original shape.

Hereinafter, a detailed description will be made about movements and states of the components of the connector 100 and the mating connector 700 during the removal of the connector 100 that is connected with the mating connector 700.

From the mating assurance state shown in each of FIGS. 13 to 16, the CPA member 400 is moved rearward relative to the housing 200. Then, the slanted surface 446 (see FIG. 28) of the distal end portion 440 abuts against the front surface 242 of the stopper 240. From this state, the CPA member 400 is further moved rearward relative to the housing 200. Then, the additional abutment portion 447 of the distal end portion 440 rides on the outer surface 248 of the stopper 240 while the facing portion 453 is brought into contact with the slope surfaces 215 from its front. This contact causes the facing portion 453 to receive an inward force in the perpendicular direction, or in the width direction, from the slope surface 215 and then causes the transmission portion 454 to transmit the inward force to both the abutment portion 442 and the release projection 444. From this state, the CPA member 400 is further moved rearward relative to the housing 200. Then, the pressed portion 452 rides on the repositioning portion 210, while the facing portion 453 rides on the repositioning portion 210 and is then brought into contact with the faced portion 230 in the front-rear direction. Accordingly, the CPA member 400 is moved from the regulation position RGP to the allowance position ALP, and the connector assembly 10 changes its state into the mated state shown in each of FIGS. 9 to 12. It is noted that, during a process where the connector assembly 10 changes its state from the mating assurance state to the mated state, each of the first protrusion portion 456 and the second protrusion portion 458 of the second arm portion 450 rides over the faced portion 230 of the housing 200 and is moved rearward of the housing 200. Accordingly, also during the process where the connector assembly 10 changes its state from the mating assurance state to the mated state, the operator of the CPA member 400 can feel clicking sensations which are produced when the first protrusion portion 456 and the second protrusion portion 458 ride over the faced portion 230. This enables the operator of the CPA member 400 to properly recognize the changing of the state of the connector assembly 10 to the mated state.

Also during the process where the connector assembly 10 changes its state from the mating assurance state to the mated state, the mating end portion 711 of the mating connector 700 continues to be in contact with the inner end 4446 of the release projection 444 while the first arm portion 430 continues to be deformed outward in the perpendicular direction, or in the width direction. When the connector assembly 10 changes its state from the mating assurance state to the mated state, the repositioning portion 210 of the housing 200 presses, by a pressing force, the pressed portion 452 of the second arm portion 450 in the perpendicular direction, or in the width direction, and the transmission portion 454 of the second arm portion 450 transmits the pressing force to the distal end portion 440 while the second arm portion 450 is elastically deformed.

From the mated state, the operator presses the operation portion 283 downward to move each of the lock portions 220 to the release position RP so that the lock of the mated state of the housing 200 with the mating housing 710 is released, and then the operator moves the connector 100 rearward relative to the mating connector 700. Then, the mating end portion 711 of the mating connector 700 breaks contact with the release projection 444 of the distal end portion 440 and is moved forward of the release projection 444. Thus, the connector assembly 10 changes its state into the half-mated state.

In a case where the first arm portion 430 does not have the aforementioned plastic deformation under the mating assurance state, the connector assembly 10 takes the half-mated state shown in each of FIGS. 5 to 8. Specifically, referring to FIG. 6, upon changing of the state of the connector assembly 10 from the mated state to the half-mated state, the abutment portion 442 of the distal end portion 440 is repositioned from the non-facing position UFP to the facing position FP by elastic forces of both the first arm portion 430 and the second arm portion 450 because the first arm portion 430 does not have the aforementioned plastic deformation. It is noted that, in this case, the pressed portion 452 is in non-contact with the repositioning portion 210 at a point when the abutment portion 442 is moved to the facing position FP.

On the other hand, when the connector assembly 10 changes its state from the mated state to the half-mated state in a case where the first arm portion 430 has the aforementioned plastic deformation under the mating assurance state, the abutment portion 442 of the distal end portion 440 is repositioned from the non-facing position UFP to the facing position FP by the transmission portion 454 transmitting the pressing force, by which the repositioning portion 210 presses the pressed portion 452, to the distal end portion 440. In other words, the connector 100 of the present embodiment is configured so that, when the connector 100 is removed from the mating connector 700 after the CPA member 400 is moved from the regulation position RGP to the allowance position ALP even in a case where the first arm portion 430 is plastically deformed, the repositioning portion 210 presses the pressed portion 452 by the pressing force, and the transmission portion 454 transmits the pressing force to the distal end portion 440, and thereby the abutment portion 442 is repositioned to the facing position FP.

In particular, the CPA member 400 of the present embodiment is configured so that the second arm portion 450 is coupled with the distal end portion 440 which is provided with the abutment portion 442. Accordingly, the connector 100 of the present embodiment is configured so that the repositioning of the abutment portion 442 from the non-facing position UFP to the facing position FP is reliably achieved.

In short, when the connector 100 is removed from the mating connector 700 after the CPA member 400 is moved from the regulation position RGP to the allowance position ALP in the case where the first arm portion 430 is not plastically deformed under the mating assurance state, the abutment portion 442 is positioned at the facing position FP under a state where the pressed portion 452 is in non-contact with the repositioning portion 210. Alternatively, when the connector 100 is removed from the mating connector 700 after the CPA member 400 is moved from the regulation position RGP to the allowance position ALP in the case where the first arm portion 430 is plastically deformed under the mating assurance state, the abutment portion 442 is positioned at the facing position FP under a state where the pressed portion 452 is in contact with the repositioning portion 210.

Finally, in the connector assembly 10 under the half-mated state, the connector 100 is removed rearward from the mating connector 700. Thus, a removal operation of the connector 100 from the mating connector 700 is completed. It is noted that, if the first arm portion 430 does not have the aforementioned plastic deformation under the mating assurance state, the connector assembly 10 takes the unmated state shown in FIG. 2 at a point when the removal operation of the connector 100 from the mating connector 700 is completed.

Although the specific explanation about the present invention is made above referring to the embodiments, the present invention is not limited thereto and is susceptible to various modifications and alternative forms.

Although the release projection 444 of the aforementioned embodiment projects in the perpendicular direction from the distal end portion 440, the present invention is not limited thereto. Specifically, the release projection 444 may project in the perpendicular direction from the first arm portion 430. Alternatively, the release projection 444 may be provided so as to extend across a boundary between the first arm portion 430 and the distal end portion 440. In other words, the connector 100 should be configured as follows: at least one of the first arm portion 430 and the distal end portion 440 is provided with the release projection 444; and the release projection 444 projects in the perpendicular direction from the at least one of the first arm portion 430 and the distal end portion 440. If the release projection 444 is provided close to the abutment portion 442, the movement of the abutment portion 442 from the facing position FP to the non-facing position UFP through the transition from the half-mated state to the mated state can be achieved with a small displacement of the first arm portion 430 and, therefore, the connector 100 can be downsized in comparison with a case where the release projection 444 is provided far from the abutment portion 442. Thus, it is more preferable for the release projection 444 to be provided at a location close to the abutment portion 442.

Although the connector 100 of the present embodiment is configured so that the transmission portion 454 transmits the pressing force to the distal end portion 440 when the connector 100 is removed from the mating connector 700 after the CPA member 400 is moved from the regulation position RGP to the allowance position ALP, the present invention is not limited thereto. Specifically, the connector 100 may be configured so that the transmission portion 454 transmits the pressing force to the first arm portion 430 when the connector 100 is removed from the mating connector 700 after the CPA member 400 is moved from the regulation position RGP to the allowance position ALP. In other words, the connector 100 should be configured so that, when the connector 100 is removed from the mating connector 700 after the CPA member 400 is moved from the regulation position RGP to the allowance position ALP even in the case where the first arm portion 430 is plastically deformed, the repositioning portion 210 presses the pressed portion 452 by the pressing force and the transmission portion 454 transmits the pressing force to at least one of the first arm portion 430 and the distal end portion 440 and thereby the abutment portion 442 is repositioned to the facing position FP.

Although the mating housing 710 of the mating connector 700 of the aforementioned embodiment is not provided with a recess which receives the release projection 444 of the connector 100 under the mating assurance state, the present invention is not limited thereto. Specifically, the mating housing 710 of the mating connector 700 may be provided with a recess which receives the release projection 444 of the connector 100 under the mating assurance state so that a stress from the mating housing 710 can be prevented from acting on the first arm portion 430 via the release projection 444 to avoid the plastic deformation of the first arm portion 430. Although the present invention is based on the problem arising upon the mating of the connector 100 with the existing mating connector 700 which does not have such a recess, this does not exclude application of the present invention to a mating connector 700 having such a recess.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector that is connectable with a mating connector which is positioned forward of the connector in a front-rear direction, the mating connector comprising a mating housing, the mating housing having a mating lock portion and a mating release portion, and the connector comprising:

a housing; and a connector position assurance (CPA) member;

wherein:

the housing is mateable with the mating housing which is positioned forward of the housing in the front-rear direction;

the housing is provided with a repositioning portion, a lock portion and a stopper; the repositioning portion is bulged in a perpendicular direction perpendicular to the front-rear direction;

the lock portion is selectively positionable at a lock position or at a release position;

when the lock portion is positioned at the lock position, the lock portion and the mating lock portion lock a mated state where the housing is mated with the mating housing;

the CPA member is attached to the housing so as to be movable between a regulation position and an allowance position in the front-rear direction;

the allowance position is positioned rearward of the regulation position in the front-rear direction;

the CPA member has a base end portion, a regulating portion, a first arm portion, a distal end portion and a second arm portion;

the regulating portion extends forward in the front-rear direction from the base end portion;

when the CPA member is positioned at the regulation position, the regulating portion regulates a movement of the lock portion from the lock position to the release position;

when the CPA member is positioned at the allowance position, the regulating portion allows the movement of the lock portion from the lock position to the release position;

the first arm portion extends forward in the front-rear direction from the base end portion;

the distal end portion is supported by the first arm portion;

the distal end portion is provided with an abutment portion;

the abutment portion is selectively positionable at a facing position or at a non-facing position;

the abutment portion is positioned at the facing position when the connector is not connected with the mating connector while the CPA member is positioned at the allowance position;

when the abutment portion is positioned at the facing position, the abutment portion is positioned rearward of the stopper in the front-rear direction and faces the stopper in the front-rear direction while a movement of the CPA member from the allowance position to the regulation position is regulated;

when the abutment portion is positioned at the non-facing position, the abutment portion does not face the stopper in the front-rear direction while the CPA member is movable from the allowance position to the regulation position;

at least one of the first arm portion and the distal end portion is provided with a release projection;

the release projection projects in the perpendicular direction from the at least one of the first arm portion and the distal end portion;

upon connection of the connector with the mating connector, the release projection is pushed by the mating release portion and moves the abutment portion from the facing position to the non-facing position;

the second arm portion extends forward in the front-rear direction from the base end portion;

at least when the CPA member is positioned at the allowance position, the second arm portion is positioned away from the first arm portion in the perpendicular direction and is positioned between the release projection and the repositioning portion in the perpendicular direction;

the second arm portion is provided with a pressed portion and a transmission portion; and when the connector is removed from the mating connector after the CPA member is moved from the regulation position to the allowance position even in a case where the first arm portion is plastically deformed, the repositioning portion presses the pressed portion by a pressing force and the transmission portion transmits the pressing force to at least one of the first arm portion and the distal end portion and thereby the abutment portion is repositioned to the facing position.

2. The connector as recited in claim 1, wherein the second arm portion is coupled with the distal end portion.

3. The connector as recited in claim 1, wherein:

the first arm portion is provided with a receiving portion; and when the CPA member is positioned at the regulation position, the receiving portion receives, at least in part, the stopper.

4. The connector as recited in claim 1, wherein:

the mating housing has a mating end portion which is configured to be mated with the housing;

the mating release portion is the mating end portion of the mating housing;

the housing is provided with an accommodation portion;

the accommodation portion accommodates the mating end portion upon the connection of the connector with the mating connector; and the release projection is positioned, at least in part, in the accommodation portion when the connector is not connected with the mating connector while the CPA member is positioned at the allowance position.

5. A connector assembly comprising:

a connector comprising a housing and a connector position assurance (CPA) member; and a mating connector comprising a mating housing, the mating housing having a mating lock portion and a mating release portion, wherein:

the connector is connectable with the mating connector, which is positioned forward of the connector in a front-rear direction, the housing is mateable with the mating housing which is positioned forward of the housing in the front-rear direction;

the housing is provided with a repositioning portion, a lock portion and a stopper; the repositioning portion is bulged in a perpendicular direction perpendicular to the front-rear direction;

the lock portion is selectively positionable at a lock position or at a release position;

when the lock portion is positioned at the lock position, the lock portion and the mating lock portion lock a mated state where the housing is mated with the mating housing;

the CPA member is attached to the housing so as to be movable between a regulation position and an allowance position in the front-rear direction;

the allowance position is positioned rearward of the regulation position in the front-rear direction;

the CPA member has a base end portion, a regulating portion, a first arm portion, a distal end portion and a second arm portion;

the regulating portion extends forward in the front-rear direction from the base end portion;

when the CPA member is positioned at the regulation position, the regulating portion regulates a movement of the lock portion from the lock position to the release position;

when the CPA member is positioned at the allowance position, the regulating portion allows the movement of the lock portion from the lock position to the release position;

the first arm portion extends forward in the front-rear direction from the base end portion;

the distal end portion is supported by the first arm portion;

the distal end portion is provided with an abutment portion;

the abutment portion is selectively positionable at a facing position or at a non-facing position;

the abutment portion is positioned at the facing position when the connector is not connected with the mating connector while the CPA member is positioned at the allowance position;

when the abutment portion is positioned at the facing position, the abutment portion is positioned rearward of the stopper in the front-rear direction and faces the stopper in the front-rear direction while a movement of the CPA member from the allowance position to the regulation position is regulated;

when the abutment portion is positioned at the non-facing position, the abutment portion does not face the stopper in the front-rear direction while the CPA member is movable from the allowance position to the regulation position;

at least one of the first arm portion and the distal end portion is provided with a release projection;

the release projection projects in the perpendicular direction from the at least one of the first arm portion and the distal end portion;

upon connection of the connector with the mating connector, the release projection is pushed by the mating release portion and moves the abutment portion from the facing position to the non-facing position;

the second arm portion extends forward in the front-rear direction from the base end portion;

at least when the CPA member is positioned at the allowance position, the second arm portion is positioned away from the first arm portion in the perpendicular direction and is positioned between the release projection and the repositioning portion in the perpendicular direction;

the second arm portion is provided with a pressed portion and a transmission portion; and when the connector is removed from the mating connector after the CPA member is moved from the regulation position to the allowance position even in a case where the first arm portion is plastically deformed, the repositioning portion presses the pressed portion by a pressing force and the transmission portion transmits the pressing force to at least one of the first arm portion and the distal end portion and thereby the abutment portion is repositioned to the facing position.

* * * * *